United States Patent
Lam

(10) Patent No.: US 7,234,132 B2
(45) Date of Patent: Jun. 19, 2007

(54) APPLICATION INTEGRATION MODEL FOR DYNAMIC SOFTWARE COMPONENT ASSEMBLY WITHIN AN APPLICATION AT RUNTIME

(75) Inventor: Thanh V. Lam, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/230,509

(22) Filed: Aug. 29, 2002

(65) Prior Publication Data

US 2004/0045013 A1    Mar. 4, 2004

(51) Int. Cl.
*G06F 9/44* (2006.01)
(52) U.S. Cl. ....................... 717/120; 717/121
(58) Field of Classification Search ................ 717/120, 717/121
See application file for complete search history.

(56) References Cited

U.S. PATENT DOCUMENTS

| | | | |
|---|---|---|---|
| 5,084,813 A | 1/1992 | Ono | 395/1 |
| 5,896,530 A | 4/1999 | White | 395/671 |
| 6,078,743 A | 6/2000 | Apte et al. | 395/701 |
| 6,138,171 A | 10/2000 | Walker | 709/318 |
| 6,256,772 B1 | 7/2001 | Apte et al. | 717/1 |
| 6,269,473 B1 | 7/2001 | Freed et al. | 717/1 |
| 6,327,623 B2 | 12/2001 | Watts | 709/229 |
| 6,529,948 B1 * | 3/2003 | Bowman-Amuah | 709/217 |
| 6,694,513 B1 * | 2/2004 | Andersson et al. | 717/165 |

FOREIGN PATENT DOCUMENTS

| | | |
|---|---|---|
| EP | 1072967 A2 | 1/2001 |
| JP | 2000231479 A | 8/2000 |
| WO | WO01/48625 A1 | 7/2001 |

OTHER PUBLICATIONS

"Flexible Surface Mounted Component Placement Sequence Optimizer", IBM Technical Disclosure Bulletin, vol. 30, No. 10, Mar. 1988, pp. 42-45.

(Continued)

*Primary Examiner*—Wei Zhen
*Assistant Examiner*—Philip Wang
(74) *Attorney, Agent, or Firm*—Geraldine D. Monteleone, Esq.; Kevin P. Radigan, Esq.; Heslin Rothenberg Farley & Mesiti P.C.

(57) ABSTRACT

A technique is presented for integrating software components. The technique includes providing an application integration model capable of adapting to different environments by dynamically using different software components at application runtime. The software components are categorized into different stages, with the stages being indicative of when the software components are to be loaded and executed within an application by the application integration model. The technique further includes employing the application integration model to assemble software components into the application within a runtime environment. The application integration model includes an application runtime driver (ARD), which drives work flows of the application integration model through multiple predefined application stages, and a component runtime integration box (CRIB), which includes multiple common data structures employed by the software components during integration into the application.

14 Claims, 15 Drawing Sheets

OTHER PUBLICATIONS

"Improvised Assembly Mechanism for Component-Based Mobile Applications", Masahiro Mochizuki and Hideyuki Tokuda, IEICE Transactions on Communications, vol. E84-B, No. 4, Apr. 2001, pp. 910-919.

"Towards a Taxonomy of Software Connectors", Nikunj R. Mehta, Nenad Medividovic, and Sandeep Phadke, ACM 23000 1-58113-206-9/00/06, pp. 178-187.

"Software Engineering for Mobility: A Roadmap", Gruia-Catalin Roman, Gian Pietro Picco and Amy L. Murphy, ACM 2000 1-58113-253-0/0076, pp. 243-258.

"Synthesis of Self-Adaptive Software", Akos Ledeczi, Gabor Karsai and Ted Bapty, 0-7803-5846-5/00 2000 IEEE.

"Design-time Assembly of Runtime Containment Components", David H. Lorenz and Pedrag Petkovic, 0-7695-0774=3/00 2000 IEEE, pp. 195-204.

"Software Components Growing to Component Software With The CRIB", T. Lam, L. Tao, SSGRR 2002 Winter Internatonal Conference on Advances in Infrastructure for Electronic Business, Education, Science and Medicine on the Internet, L'Aquila, Italy, Jan. 21-27, 2002; http://www.ssgrr.it/en/ssgrr2002w/papers.htm.

* cited by examiner

APPLICATION INTEGRATION MODEL FOR DYNAMIC SOFTWARE COMPONENT ASSEMBLY WITHIN AN APPLICATION AT RUNTIME

TECHNICAL FIELD

This invention relates in general to software component integration into an application, and more particularly, to an application integration technique and model which can dynamically integrate software components into an application at runtime without requiring prior compilation or linking of the software components.

BACKGROUND OF THE INVENTION

Usability and marketability of a software application are often judged by the number of different environments that the application can execute in. The different environments include different types of hardware platforms, operating systems, input/output (I/O) devices, user defined preferences, etc.

Software applications are conventionally built in development environments as a whole monolithic program or as a collection of smaller units such as code modules, static or dynamic libraries, or software components. One difficulty with this approach is that everything in the application needs to be completed and perfected in the development environment. Unfortunately, the running conditions or runtime environments are often highly diverse, and are increasing in number with the continual introduction of new devices. Thus, applications have become very complex in order to contain various types of intelligent logic to predict and react to the expected environment conditions. This increased complexity increases the cost of application development, and at some point, it may not be practicable to have an application that "knows" in advance all of the environments that the application could execute in.

The problem is further amplified by application development cycles becoming shorter and shorter, and by the fact that an "escaped" defect in an application identified in the field is difficult to debug and expensive to remedy. With software components becoming more popular, the problem is further multiplied. This is because when software components are integrated in the development environment into an application, it is difficult to test the software components for all possible runtime environments. Even if this can be accomplished, the developed application might need to be modified with a new platform, for example, another device to run the application is introduced.

In view of the above difficulties and complexities with traditional application development, a new design perspective is believed needed for shifting from the complete application control of the development environment to enabling an application to explore and adapt to a runtime environment. The present invention is directed to providing such a design shift.

SUMMARY OF THE INVENTION

The shortcomings of the prior art are overcome and additional advantages are provided through the provision of a method for integrating software components. The method includes, providing an application integration model capable of adapting to different environments by dynamically using different software components at application runtime, wherein the software components are categorized into different stages, and the stages are indicative of when the software components are to be loaded and executed within an application by the application integration model; and employing the application integration model to assemble software components into the application within a runtime environment.

System and computer program products corresponding to the above-summarized methods are also described and claimed herein.

Advantageously, provided herein is an application integration model wherein software components are loaded dynamically and integrated at runtime, assisted by names provided in an input file. The names of the software components are not coded into the program itself. Thus, a completely new component can be loaded in the future into an application without knowing its name at the time of initial application coding. In one embodiment, the application integration model employs four stages which provide structure for the loading and execution of the software components within the application. By way of example, these four stages might comprise an initialization stage, a configuration stage, an operation stage and a finalization stage, each of which are described in detail herein. These stages provide a relative reference time for software components to be loaded into an application and facilitate the operation and workflow of the components.

The application integration model proposed herein comprises an application programming interface which allows pre-built software components to be loaded and executed in a runtime environment without having been preprogrammed into the application. The application integration model provides interfaces and facilities for components that adhere to the model. This is believed to comprise an open, component based approach. In accordance with the technique disclosed herein, a package may be provided which includes the assembly materials and software components for a particular application and solution. Such a package may be formed with many different types of components and the application or solution can perform anything within the limits of the components and the package. There is no compiling, linking or binding of software components, although the components are loaded dynamically at runtime employing the integration model.

Certain common components within the model, herein referred to as the application runtime driver (ARD) and the component runtime integration box (CRIB), are portable between applications that are assembled in accordance with the model. Predefined software components are integrated into an application using the facilities of the common components of the model and based on the relevant stages or roles in the life cycle of the application.

The CRIB component stores local environment variables within which the integrated software components are to run, and also serves as a service registry for components to register and request the services of other components in the application. The CRIB component does not contain other components, by merely information and records about the application executions and local environments. The CRIB also contains a record file for logging application execution/operating information and local environment information over multiple application runs. This component and its core contents can be carried with the application when brought to a different environment.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a software component integration facility is provided which enables different software components to be integrated into an application in a runtime environment. The facility includes an application integration model capable of adapting to different environments by dynamically using different software components at runtime. Software components are categorized into different stages and the stages are indicative of when the software components are to be loaded and executed within an application by the application integration model. The integration model is then employed to dynamically assemble software components into the application within the runtime environment.

Figure 1A:
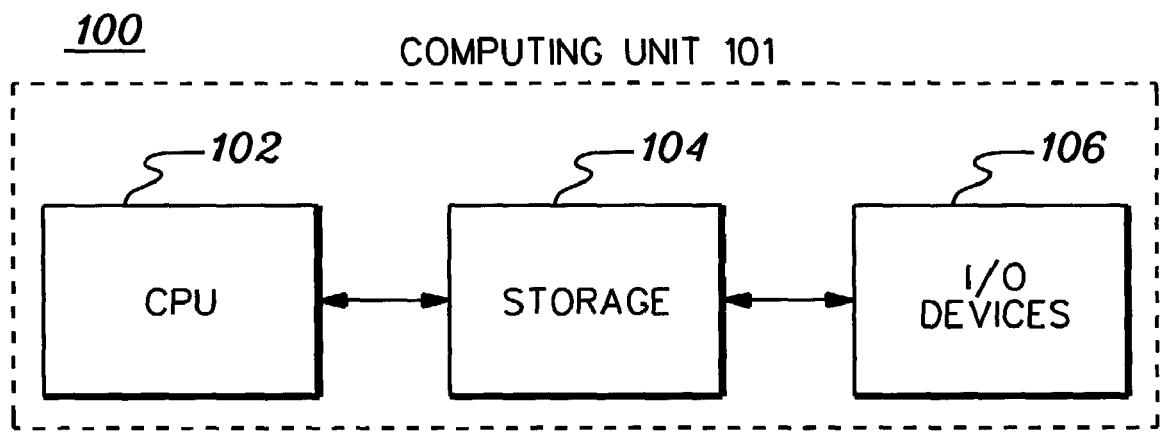
FIG. 1A depicts one example of a computer environment incorporating and using the application integration facilities of the present invention.
Figure 1B:
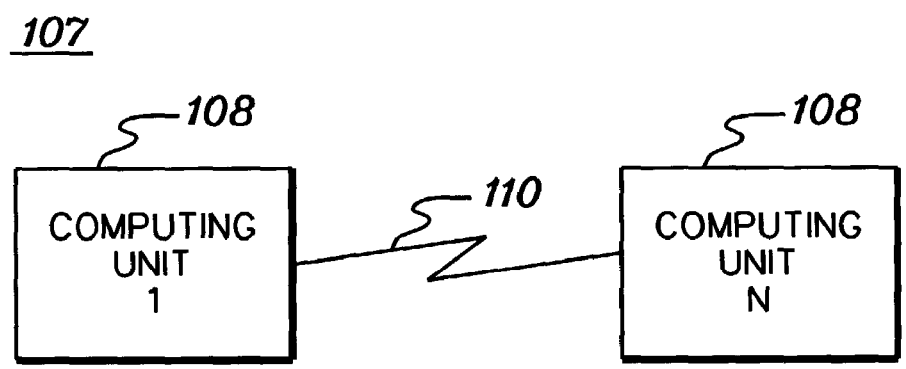
FIG. 1B depicts an alternate embodiment of a computing environment incorporating and using the application integration facilities of the present invention.

Examples of computer environments incorporating and using the software component integration facility of the present invention are generally depicted in FIGS. 1A & 1B. Referring first to FIG. 1A, a computer environment 100 includes, for instance, a computing unit 101 having at least one central processing unit 102, a main storage 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit 102 is coupled to main storage 104, which is directly addressable and provides for high speed processing of data by the central processing unit. Main storage may be either physically integrated with the CPU or constructed in stand alone units.

Main storage 104 is also coupled to one or more input/output devices 106. These devices include, for instance, keyboards, communications controllers, teleprocessing devices, printers, magnetic storage media (e.g., tape, disks), direct access storage devices, and sensor based equipment. Data is transferred from main storage 104 to input/output devices 106, and from the input/output devices back to main storage.

In one example, computer environment 100 is a single system environment, which includes an RS/6000 computer system running an AIX operating system. (RS/6000 and AIX are offered by International Business Machines Corporation). The invention is not limited to such an environment, however. The capabilities of the present invention can be incorporated and used within many types of computer environments and many types of computer systems. For instance, computer environment 100 can include a UNIX workstation running a UNIX-based operating system. Other variations are also possible and are considered a part of the claimed invention.

Another embodiment of a computer environment incorporating and using the software component integration capability of the present invention is depicted in FIG. 1B and described in detail below.

In one example, a computer environment 107 includes a plurality of computing units 108 coupled to one another via a connection 110. In one example, each unit is a UNIX workstation running a UNIX-based operating system, and the units are coupled to one another via a TCP/IP connection. Each unit includes, for example, a central processing unit, memory and one or more input/output devices, which are well known in the art.

The above-described computer environment in which each unit is a UNIX workstation running a UNIX-based operating system is only one example, however. The software component integration capability of the present invention can be incorporated and used with any type of computing units, computers, processors, nodes, systems, workstations and/or environments, without departing from the spirit of the present invention.

For instance, in another embodiment, one or more of the units is a PS/2 offered by International Business Machines Corporation. In a further embodiment, one or more of the units is based upon the Enterprise Systems Architecture offered by International Business Machines Corporation. Further, the operating system need not be UNIX-based. For example, the operating system can include the Multiple Virtual Storage (MVS) operating system offered by International Business Machines Corporation. Additionally, connection 104 need not be TCP/IP. It can be any type of wire connection, token ring or network connection, to name just a few more examples.

In yet a further embodiment, the environment includes a large parallel system with a plurality of units (e.g., 512 nodes) coupled to one another via a network connection, such as a switch. Additionally, in other environments, the units can be of differing types connected to one another via one or more connections. The invention is not limited to a particular number of units coupled together nor the type of units that are coupled.

Again, neither a computing unit nor the invention is limited to the above examples. A computing unit can include other types of nodes, computers, processors, systems, workstations, and/or environments without departing from the spirit of the present invention. All of these types are considered within the scope of the present invention.

Prior to explaining various aspects of the present invention, the following definitions are provided for facilitating explanation of the software component integration capability disclosed herein.

Application: An application is a software product that includes basic (or common) components and one or more pre-built software components. The basic components include an application runtime driver (ARD) and a component runtime integration box (CRIB), which provide a core to the application. Other pre-built components can be sorted in, for example, four categories: Initialization, Configuration, Operation, or Finalization.

ARD: Application Runtime Driver is a basic component that makes up the barebone body of an application. It drives the workflows of the application by going through certain predefined application states, such as: Initialization, Configuration, Operation, and Finalization.

CRIB: Component Runtime Integration Box is an internal component to an application as defined above. The cores of this component are the Service Registry, State Table, Time Table, and application environment variables. By providing these common data structures, the CRIB can be used for automating the application integration at runtime.

Registry: The application component Registry is a place for listing methods provided by components within an application. Components that have methods to offer register their services here. Other components will request these services from the registry. Then, the methods will be called from the providing components.

State Table: The State Table is an execution map for the ARD. It contains the different application states or stages and identifies the components in each state. This is the plan for ARD workflows. From the current executing pointer, past states and executed components can be traced. From there, the next state can also be visualized.

Time Table: The Time Table contains a history of application execution. Each entry of this table has a time stamp and identifies the component loaded or method called. The ARD keeps track of this table.

Runtime Environment: An application's Runtime Environment includes basic requirements that have to be met in order for the application to successfully start its execution. Usually the application translates its runtime environment requirements into a set of environment variables. The application runs in the defined contexts of those environment variables.

A discussion of the various aspects of the software component integration capabilities of the present invention is presented below, and is followed by an overview discussion of the integration capability with reference to FIGS. 2A–7C. A JAVA program implementation of the software component integration model is provided in the Appendix of this application.

Also discussed herein is testing of software applications. From a testing perspective, software applications should be tested in environments as close to the end user runtime environments as possible. In other words, local environments are where software testing is most effective and valuable. The software component integration ability to dynamically load pre-built components at runtime (as presented herein) opens up new possibilities for a user in testing those pre-built components during integration. The usefulness of this software component model can be extended for testing components in new environments as well, without major rewriting of the test driver.

From the application perspective, extraneous code checking for runtime environments is necessary to ensure code execution. Certain parts of the code may not even run in a wrong environment. This is especially a concern for software that will be part of a pervasive computing environment. It is difficult to decide on how many specific environment variables should be checked. This decision is in turn reflected in the code's complexity. In the application runtime lifecycle model presented herein, certain components have a role in obtaining local environment information at an application configuration stage. Other components assume that the application has the local environment information available. The definitions of their different roles enable both types of components to be reused with other components while maintaining similar roles. Broadly stated therefore, in one aspect, presented herein is a technique which allows use of code which checks for the runtime environment, and allows configurations to be separated from the application code.

From the software component perspective, the component software comprises certain pre-built components that have gone through rigorous unit and function testing in the development environment where they conventionally would have been integrated with other components. This is called component integration test. In one aspect, this invention proposes that a similar integration test be done in a runtime environment, which could be the first time these components are put together, because development cannot possibly do integration test in all runtime environments. One concern is that the person who initiates this test may or may not be a professional software test engineer, and may be the user who first runs the application. Furthermore, the original developer(s) and the component source code are presumably not available. All the required validations must thus be "built-in" to the components or depend upon the user's knowledge of the application.

The validations start from building up confidence integrating the components. Thus, the most commonly used components are more reliable. This disclosure calls the "application runtime driver" (ARD) the most common component that every application requires. It is also the simplest application in terms of features. This ARD is reused and only the components are exchanged for different features. From the testing perspective, it is like a test driver. For the purposes of the application runtime lifecycle model, it also serves as a frame of reference for the application components to "plug in". Rather than depending merely on the component application programming interfaces, components now have to find ways of addressing their context dependencies. A simple example is that, a component that is loaded in a later stage of the application will require some resources or services obtained by other components in the configuration stage. Hence, the component integration test proceeds from simplest to more complex.

This invention also introduces another common component that facilitates inter-component communications, referred to herein as the component runtime integration box (CRIB). The CRIB keeps track of local environments and the stages of the application as integration occurs. This is the part of the test driver that can be carried across different environments or different "life cycles" of the application. The CRIB serves both the application components and the human user when there is need to log or trace back application information for the purposes of validating, testing, or debugging an application.

In practice, the software developer's dilemma is that of generalization and localization. Although the developer would welcome the choice of making the application small and run in one particular environment locally, extra coding is added to make the application run in more than just one environment. This is the cost of generalization. All the related decisions have to be made before or during the time that the application is being developed. The application runtime lifecycle model described herein presents the arguments and methodologies for shifting these decisions into the runtime environment, where different components can be loaded based on the local environments.

A Simple Example: The Clock

When a particular application is designed or even just formed in the developer's mind, it is usually not associated with any particular environment. In general, an application is a tool that mimics or reflexes a tool in real life. A clock application is obviously a counterpart of the real clock used in every day life. The inventor who invented the original clock did not have any idea that the world is divided into different time zones. The fact that a clock in New York tells a different time than one in London is not part of the clock's functionality. One could guess if the clock works correctly in one time zone, then it will work similarly in another time zone. But one needs to bring the clock to the particular time zone to prove it. The clock is a classic case of an application that separates its functionality from its environment.

One contribution of this invention is a model of component software that can be used in testing the integration of pre-built components. Basic components of the model are described and the way they work is explained below via a simple clock application. Details of how to implement the model and testing it are presented with a case study of certain queue and stack components.

From the perspective of assembling components into a running application, communications have to happen inside the application first. From the integration test perspective, it is more than just the programming interfaces. The following are factors for integration test:
  Pinpointing of the component under test, and
  Replacing a component without modifying either the integration code or the component code.

When components are coming from different sources (independent software component developers), getting stack traces at error time may not be helpful because the source code is not available. Similarly, while an application may be suspended for unknown reasons, attaching a debugger at runtime also requires the availability of the application source code.

Here is where the approach of loading components dynamically at runtime as presented herein has advantages. Every time a component is loaded or a method is called for execution, a record can be made, in the Component Runtime Integration Box (CRIB). These records make up the history of component loading and method calling within the application. Since the CRIB is independent of the loaded components or the called methods, these records are valuable for testing and debugging.

An example of global knowledge in software programming is the internationalization ability in some encoding standards such as Unicode that can basically display the most popular languages of the world. However, an internationalized application rarely needs to display more than one language at the same time. Therefore, a localized solution is to figure out the "local" language at runtime. There are existing mechanisms in solving this problem such as providing each language in a separate library and message catalog. Then, at runtime a variable is set to point to a particular library and catalog.

Based on the component reuse premise and methodologies, this disclosure suggests that a software maker does not have to make all the decisions at development time. Rather, the developer can shift the decision logic to the runtime environment, where the user has control of the application. Then, decisions are made based on the user's choices that can be ensured by on-the-fly integration testing. It is the best for both worlds where software maker decisions meet user choices.

This invention thus uses the localized environments to reduce complexity. One application need not have knowledge of all environments in the software world to run in a local environment. The person who is most knowledgeable in a local environment is, not surprisingly, the user. Hence, making good use of user know-how and local situations can reduce the complexity in component reuse and increase the capability of runtime problem determination.

Component Software Integration

A. An Example

Assume that a clock application is to be delivered to three different systems. Each system requires a different language for usability purposes. The three different languages are: English, Chinese, and Italian.

One solution would be to write a single clock application with menus so that at runtime the user can choose the preferred language. Notice that these menus do not have anything to do with the clock's functionality. They are just means for the user to change the display context of the clock. In this case, the context is a certain language. Adding these menus no doubt increases complexity and leads to certain drawbacks. If later, a forth system will need a different language, for instance, Vietnamese, then the clock application needs to be modified. Code modification or white box code reuse is part of the component reuse problem. Quality testing disadvantages result because there is no way to independently test the new language until development has added the new language into the menus.

This invention describes how the application can be broken down into components from an application perspective. It is observed that every application has some common parts that the programmer follows when writing code without consciously knowing it such as the four parts of a program: initialization, configuration, operating, and finalization. These four parts, which have been implemented in a software platform such as the Java 2 Enterprise Edition, can be "globalized" in each application. One aspect of the present invention is to match these stages with the practice of writing the "driver" program in testing. Components are like "localized" parts plugging into this "driver". This invention discusses the issues of interfaces and context dependency between components.

B. Application Runtime Life Cycle: An Analogy

In programming, each programmer is the creator. This implies that the programmer has total control on what and how to make a program. However, this is probably only true in development. In real life, applications run in the absence of their creators, i.e., the programmers. Hence, the purpose of borrowing the runtime life cycle metaphor is to emphasize the application perspective. The runtime life cycle serves as a frame of reference for components to be broken up and plugged into the application.

The term "life cycle" has been used in software development to describe the software development and maintenance processes. It is actually the software maintenance churn cycle or software engineering processes. Software engineering is in general a persistent process among software makers. This invention emphasizes the life cycle of the application runtime as opposed to the life cycle of the software development.

Application runtime life is in existence in memory for a period of time. When the runtime ends, it completes one life cycle. It is expected that an application can run more than one time. For each run, it follows similar stages of operations but with different contexts such as different data input or output. Therefore, like a human being who can learn from previous experiences, an application can be recovered and restarted over after failure or termination. This concept suggests that application activities in the last run can be applied or corrected in the next run.

C. The Four Runtime Stages

In one aspect, a concept of the present invention is for the application to be assembled on-the-fly at runtime. The application starts from a simple stage and proceeds to more complex stages. An overview of four basic stages of a life of a running application follows.

1. Initialization or Arrival Stage

At the beginning of this stage, the application comes into existence in the system memory. This is the simplest form of the application. However, it tells a lot about the application, for instance:

Does this part of the code exist where it should?
Is the code executable?
How about code compatibility?

A No answer to any of the above questions results in failure to start the application.

In the simple clock example, this stage is even before the clock starts. From the test perspective, there has to be some means for recording this situation.

2. Configuration or Growing Stage

The application in this stage loads components that do necessary configurations, such as:

Opening input/output streams
Connecting to networks
Initializing graphic context Note that the above items are used later by other components in the application. Also note that the items are all local to where the application is running.

In the simple clock example, either a standard output stream descriptor or a graphic context is initiated and stored in memory so that the later loaded components in the operating stage can access them.

3. Operating or Matured Stage

At this stage, the application loads the main feature components. This is the "main body" in programming terms. What happens in this stage can be vague, but in one aspect, this invention focuses on integration test. Operations for testing the integration of components can include:

Loading of a component
Running a method provided by the component
Repeatedly invoking methods of the component with different arguments.

In the simple clock example, the local Unicode is passed into the clock component so that it can display the right language without any conditional testing. Also, as mentioned in the Configuration Stage, the clock component needs a graphic context or a standard output stream descriptor to display on. These two things are the clock component's context dependency. It may also provide an interface method called "start" for example.

4. Finalization or Departure Stage

The end of this stage marks the termination of the application. This is another simple stage. However, like the Initialization stage, this stage is invaluable for testing and debugging the integration of components. Information about this life cycle that is about to end can be saved for the next life cycle use. This information can be:

Did the application fail or succeed?
What stage was prior to this Finalization stage?
What components had been loaded?

These are valuable test data, which a programmer infrequently addresses unless the application fails, but then it may be too late.

In the simple clock example, it could be that the clock component failed to load the Unicode language. This answers the test question why did it fail.

Methodology for Testing

In certain prior approaches, the test cases are written even before the application code. Obviously, those test cases will fail first and then come back to successfully pass when the application code is added. Most of these tests are functional or unit tests where the programmer is highly knowledgeable of the written code. This is not the case in component integration testing such as discussed herein, where the components are already pre-built and no modification to source code is allowed. What is available at this point are the component interfaces and explicit context dependencies.

A. A Package Approach

This package software component integration testing framework includes in a package the necessary components, and certain optional components, for starting and testing the components within the application in the local environment. Two types of components might compose the package: common components and application components.

a) Common components are components that always come with the package. Except for the variety of inputs and the historical information that may have been previously saved, these components are the same for any package. Two such components are the:

Application Runtime Driver (ARD), and
Component Runtime Integration Box (CRIB).

b) Application software components are specific to the application. Some of these components are minimum requirements for starting the application, and changing these components will change the application's functions. Depending on how these components are written to communicate with each other, they can be thought of as:

Tightly coupled (or closely interfaced), and
Open interfaced.

In one aspect, the common components are the features introduced in this application, and are described in detail below. The application software components are suggested concepts. Component makers can readily write them according to suggestions based on the common components. The prototype discussion includes some samples of the application components.

B. Application Runtime Driver (ARD)

An application is a unit of software that can provide services to a user. Although there may never be a general or universal application, most applications have similar structures or organization. A test driver represents such common patterns because it is in general written to test some part of the application or functioning of the code.

1. A Test Driver

A programmer writes a test driver to test code in unit testing. The test driver usually starts from a simple template that has been used many times. Test cases are then gradually added when additional code is completed. At the end of the application development, the test driver becomes a full-blown test suite with all the test cases written for this particular application. When the application is released to the public, this test driver is abandoned or kept for regression test purposes. Even with the same programmer, for the next application, the test driver will be started from the simplest template again.

With software components, the test driver can be written for reuse on testing any other code. Using similar ideas, a test driver has a simple code skeleton, i.e., a component that can be reused. As discussed below, the test driver can have, in one embodiment, four stages so that it can readily grow in complexity from the simplest to more complex test cases.

The flow of the test driver is automated as in a state machine which reads in inputs for instructions on what components should be loaded and which operations should be executed.

2. A Frame of Reference

In addition to the benefits of reusability, the test driver also plays an important role in how the components can be held together. It serves two purposes:

a) A time line of components executing: the components interface with each other through the time line, thus leading to component isolation. Sometimes when a component interfaces with another component, it is hard to pinpoint which end of the interface is at fault. The test driver can function as a third party reference for tracing back a failure.

b) A relative location reference: where and what components should be plugged into the structures of the test application. It suggests that every software component is written with a purpose in mind. In other words, a component is designed to work within one of the four stages. For example, an operating component will not work if plugged into the configuration stage.

3. How ARD Works

The test driver starts at the INITIAL stage by reading inputs telling the ARD the name of the application. It may also read in default local system information.

At the end of the Initialization stage, the test driver transfers to the Configuration (or CONFIG) stage. In this stage, configuration components are loaded and registered.

Then, when all the configuration components are loaded and registered, the test driver transfers to Operating (or OPERATE) stage and reads in inputs. Components in this stage are loaded with context or service requirements that can come from the previously loaded configuration components.

Finally, when all components are loaded and the services are completed, the test driver transfers to the Finalization (or FINAL) stage. At this stage, pre-built components can be loaded to perform clean-up and finalizing operations. Most of the time, the log of the execution stages, which can be contained in the memory of the application, is written out to persistent storage for use in the next run. As part of the inputs to the Initialization stage, this persistent storage can be read in and analyzed.

Also note that, if the test driver ended abnormally in any of the previous stages, it will transfer to the FINAL stage to save stage and/or debugging information.

C. Component Runtime Integration Box (CRIB)

If the ARD is the skeleton, the CRIB is analogous to the brain of the application.

The CRIB is a component containing the application contexts, i.e., information that helps the application resolve different contexts at runtime. The following are representative of what is contained in the CRIB:

name: name of the application
input file: a list of components to be loaded according to stage
register: for services, etc., and
default setup.

The above information is predefined or pre-built when the application is packaged, in the input files that the ARD will read in at the beginning of the Initialization stage. The CRIB is a common component that is not changed. Instead, changing the input file allows changes to the local environment or context data.

The Service Register is provided as part of the CRIB in order to provide a place for the Configuration components to communicate with the Operating components. It is a table containing a list of services. As discussed below, components can have closed interfaces or open interfaces. Open interface components use the Service Register, while closed interface components may not need the Service Register, although it is available.

As described above, at the Finalization stage of the test driver, application execution information can be written into persistent storage. Since the CRIB contains part of the information that will be needed in the next run of the application, it can also be saved to persistent storage in the Finalization stage.

When the ARD first starts with the Initialization component, it attempts to read the CRIB from persistent storage. If the CRIB cannot be found there, then this is the first time this application has been brought up in this environment. If a CRIB exists and is read in from persistent storage, then it is compared with the CRIB that comes with the package. This is pre-application execution analysis. Different types of analysis components can be provided as Initialization components. At the end of this analysis, one CRIB with the preferred environment information is loaded into memory. This is the application's initial CRIB.

For closed interface components, the package integrator ensures that the required components are loaded before their methods are called from other components. Configuration components should be loaded before Operating components. Even with a closed interface, use of the components can be flexible when combined with different inputs and local environment variables.

For open interface components, the CRIB provides an application programming interface to facilitate the exchange or publication of one component's interfaces or another component's context dependencies.

V. Implementation

Applications are valued and made good use of by their main functionalities. One application may include at least one function, but usually many functions. Note that the term function is used in a generic sense, rather than to mean a function in a programming language. For an end user, functions are more or less units of deployment. Therefore, making and selling components to provide certain functionalities is believed beneficial.

Three levels of skill are involved in making this approach work: component maker, package integrator, and component software evaluator. For a start, these three types of work can be carried out by a human. Then, the work can be gradually automated through software tools. In either way, the number of software components will increase because components can be made and deployed independently. Component quality will also be raised. Testing in development environments, which is no longer sufficient because the running environments are no longer under the software or component designer's control, will be enforced. This posts challenges. But in return, end users benefit because the application is highly customizable to one's preferences that play a role in pervasive, mobile, or personal computing. The Application Runtime Lifecycle Model enables final "contextual design" by users.

1. Software Component Maker (Manufacture)

The goal of the component makers is to produce as many components as possible. They make components for different platforms and different business functionalities. What they have in mind is that every component they make will be used in one of the four stages (for example) of the ARD. The component manufacturer provides necessary information about their component that will be used by the component integrator.

2. Component Integrator (Packaging)

The goal of the component integrator is to take components produced by the software component maker and put them into packages. To do that, they have to understand the two core components, ARD and CRIB, described above. The integrators choose the appropriate components for their packages and create the Input File for each package.

3. Component Software Evaluator (Assembling)

The goal of the component evaluator is to bring up the component software to their preferences using the components provided in the package, in a local environment. By customizing the inputs and optional components, an evaluator can also create simulated environments for integration testing purposes.

B. Prototype

The following groundwork is an exemplary implementation of the concepts presented herein. It provides a sense that the flexible model presented can be implemented from very simple parts or components. The Java programming language is used in this implementation for its rich collection of classes and available utilities. Java's ability of loading classes dynamically at runtime is also desirable for implementing this software component model.

1. An Example of Stack and Queue

Stack and Queue are two common data structures that are taught in basic programming classes. They are basically a collection of elements. But each of them provides different ways of inserting and removing elements. Using the Java LinkedList class from the java util package, a stack can be implemented as a class with two simple methods as follows:

```
import java.io.*;
import java.util.LinkedList;
public class Stack extends LinkedList {
    public Stack( ) {
        super( );
    }
    public void push(Object elem) {
        addLast(elem);
    }
    public Object pop( ) {
        removeLast( );
    }
    public String toString( ) {
        return "Stack";
    }
}
```

The Queue can also be implemented similarly but with the method enqueue(Object elem) in place of push(Object elem) and dequeue( ) in place of pop( ):

```
public void enqueue(Object elem) {
    addLast(elem);
}
public Object dequeue( ) {
    elem = removeFirst( );
    return elem;
}
```

To test the Stack class above, a test driver is written as following:

```
import java.io.*;
import java.util.ListIterator;
public class TestStack {
    Stack tst;
    public TestStack( ) {
        tst = new Stack( );
        tst.push(new String("100"));
        tst.push(new String("200"));
        tst.pop( );
        tst.push(new String("300"));
        ListIterator stack = tst.listIterator(0);
        while (stack.hasNext( )) {
            System.out.println(stack.next( ));
        }
    }
    static public void main( String[ ] argv) {
        new TestStack( );
    }
}
```

Similarly, to test the Queue class, the exact same test driver can be reused. However, everything that is called Stack has to be changed to Queue. The two methods push and pop have to be changed to enqueue and dequeue. Furthermore, the test driver needs to be recompiled. The problem is that the data structure used in the test driver is hard coded. Although this can be said of some form of code reuse, it is not as simple with a huge test driver that loads many data structures and calls many methods.

An alternative implementation would be to use Polymorphism or Interface in object oriented programming. Both Stack and Queue would be based on an abstract class or interface. A drawback of this implementation is that to introduce a third class, chances are the abstract class or the interface will have to be changed. This is not simple to do with a huge test driver either.

2. Use of Closed Interface Components

The problems of testing Queue and Stack can be solved with the software component integration model presented herein. Since this is a simple example, the addition of extra components seems overkill. However, the additional components are common parts of and can be reused for any application. As discussed throughout this application, this implementation emphasizes a separation of a component's real functions from its environment or context dependency.

a) The Application

As an introduction, the test driver, i.e., TestStack or TestQueue above, now becomes the following:

```
import java.io.*;
public class Application {
    private AppObserver appObs;
    private StateManager stageMgr;
    public Application( ) {
        appObs = new AppObserver( );
        stateMgr = new StateManager(appObs);
        stateMgr.activateInit( );
        while (!stateMgr.stopped( )) {
            stateMgr.execute( );
        }
    }
}
```

Notice that there is no mention about Stack or Queue. Instead, two new entities are introduced: AppObserver and StateManager. AppObserver is the code name for the CRIB and StateManger is the code name for the ARD.

b) The ARD

The ARD is implemented following the State pattern. Each of the four states is implemented as a Java class. Notice that each state corresponds to a respective stage of application runtime life cycle. All four states extend the State abstract class. The StateManager class acts as a mediator that has access to all four states. Hence, StateManger can activate a state, transfer to a next state, or execute a component in a state.

Activate a state: current state is set to this state.

Transfer to next state: the next state method of the current state is called so that the current state will be transferred to the next state.

Each state class overloads these four methods in the abstract State class:

```
public abstract class RTState {
    public abstract int execute( );
    public void tryNext( ) { }
    public void nextState( ) { }
    public void gotError( ) { }
}
```

The method execute( ) is significant. This method loads the component class file for this stage of the life cycle and executes the appropriate methods via this code segment:

```
Class classObj=Class.forName(appObs.appInput( ));
Constructor appInput=classObj.getConstructor(sign);
Object obj=appInput.newInstance(param);
Method filename=classObj.getMethod("filename", null);
Method reader=classObj.getMethod("reader", null);
inputReader=(BufferedReader)reader.invoke(obj, null);
```

By way of example, it is shown that the name of the component is read from the CRIB by the method appinput( ). The code segment also shows that the method names are "filename" and "reader". In reality, these names should be read in from the input file as described below.

c) Input File

For ease of implementation, the input file can be in the form of a text file with contents for the Stack and Queue prototype. The package integrator prepares this file.

Queue
ReadFile
IterateCmd
IterateOutput

The first line is the application name. In this case, it is also the name of the component to be loaded in the Initialization stage. Therefore, the ARD will look for the Queue class and load it.

The second line is the name of the component to be loaded in the Configuration stage. In this case, the configuration service is to read in a file. It's known from specifications that the Queue component requires a read in of a file. The file name is given from the Queue object as seen in the code segment above. The component software evaluator prepares this file to test out the functions of the Queue component.

Local data I/O is one of the types of context dependency. This is just to use closed interface between components. For an open interface, the second line would specify the service that the configuration component provides, which is reading a file, and the filename it will read. For instance, the line could read:

ReadFile service:list where list is the name of another file listing the public methods offered by the ReadFile component. In that list, each service (reading in this case) is associated with a filename.

The third line is the name of the component to be loaded in the application Operating stage. In this case, it is a command iterator that will access the service provided by the configuration component above. Since it is a closed interface, this component knows that every time it does a read, it gets a command with appropriate parameters. All it needs to do is to execute the command.

For an open interface, the Operating component needs to specify its requirements in order to perform its operations. In this case, the component needs to read in one command at a time. It keeps reading the next command until no more commands are available. The line in the Input File might be:

IterateCmd context:read where read is one of the services provided by the Configuration components.

The fourth line is also the name of a component to be loaded in the application Operating stage. Therefore, in this example, two Operating components are loaded, which are independent of each other. However, these components use or require the same service provided by the Configuration component: ReadFile. This second OP component is an output iterator which will print out every element in the data structure. Because this is a closed interface, an assumption is made that the output iterator knows that some sort of print method is provided by the Configuration component.

For an open interface, this Operating component needs to specify its requirements in order to perform its operations. In this case, the component needs to print out elements in the data structure. Line four might be:

IterateOutput context:printall where printall is a method provided by the Queue or Stack component. Hence, there may be another line in the Configuration stage such as:

Queue service:list

To summarize, in order to use open interfaces between Configuration and Operating components, the Input File might comprise:

INIT: Queue
CONF: Queue service:list1
CONF: ReadFile service:list2
OP: IterateCmd context:read
OP: IterateOutput context: printall
FINAL:

In this case, there is no Finalization component to be loaded.

C. Test Scenario

Assuming a scenario in the Java Data Structure classroom, the instructor gives out two assignments:

1. Write a Stack class using LinkedList and test it with some input.
2. Write a Queue class using LinkedList and test it with some input.

For assignment 1, students write the Stack class and then write a TestStack class to test the Stack with some input. The instructor will run the TestStack application to see if the output is correct. If the output is incorrect, the instructor can return it to the student for a redo. But that doesn't help. The instructor may have to look into the TestStack program to see if there are any bugs there. If not, the instructor has to look into the Stack class for bugs there. Similar activities happen with assignment 2.

With the software component model presented herein, the student is the package integrator. Although, the student is also a component maker because according to the assignments, two components have to be made. Now, there are different levels of student skills that can be considered for the assignments:

As a package integrator, students have all the components available to them. They will just have to look into the component specifications and pick the appropriate components. Then, they write the Input File for the package and submit it to the instructor.

As a novice component maker, students write the application components such as Stack or Queue for the package integrator students to use in the package.

As an advanced component maker, students understand the common parts of the application such as the ARD and CRIB. They might even want to write their own.

The instructor is the component evaluator who doesn't have to look into the students' programs to determine if they are correct. The instructor simply runs the package submitted by the students. Or the instructor may want to play the role of the package integrator to grade the application components written by students. The assignments may become:

Write a Stack component for Package A.
Write a Queue component for Package A or B.
Write an application that incorporates the Stack or Queue component.

The idea is that, students do not have to write an entire application and the instructor can easily evaluate the students' work. This is in the academic world, but the idea can be applied in the real world as well.

As discussed above, the fully open interfaces between the Configuration components and Operating components will allow independently developed components to communicate via the CRIB. It is a two-way communications between two types of components that have clearly defined roles. This will help reduce the complexity of interfaces if components have to communicate with other components. The CRIB serves as the mediator that can do additional verifications to assure that the interfaces are proper.

One advantage of separating the common parts of an application into the ARD and CRIB is that automated tools can be written to improve or enhance these parts without imposing upon the diverse application components. The software component makers are freed from constraints of these tools and can concentrate on the components themselves. These tools are not for component development although they can be used there as well. These tools are used at application integration time or runtime.

The prototype of the Stack and Queue in this application is one simple example of how this software component model can be used. Based on the two factors in software component integration: local environment services and context dependency, applications in other domains can be integrated similarly. The concepts presented herein can advantageously be used in mobile and pervasive computing where client applications need to dynamically determine their local environments. This software component model of ARD and CRIB could be a contribution to the global schemes of self-efficient applications.

The appendix presented herewith presents one embodiment of JAVA program files implementing a software component integration model as described herein. These JAVA program files represent only one detailed embodiment of the concepts presents. Other implementations will be readily apparent to those skilled in the art based upon the discussion provided herein.

As briefly noted above, FIGS. 2A–7C present an overview of the concepts described and claimed herein.

Figure 2A:
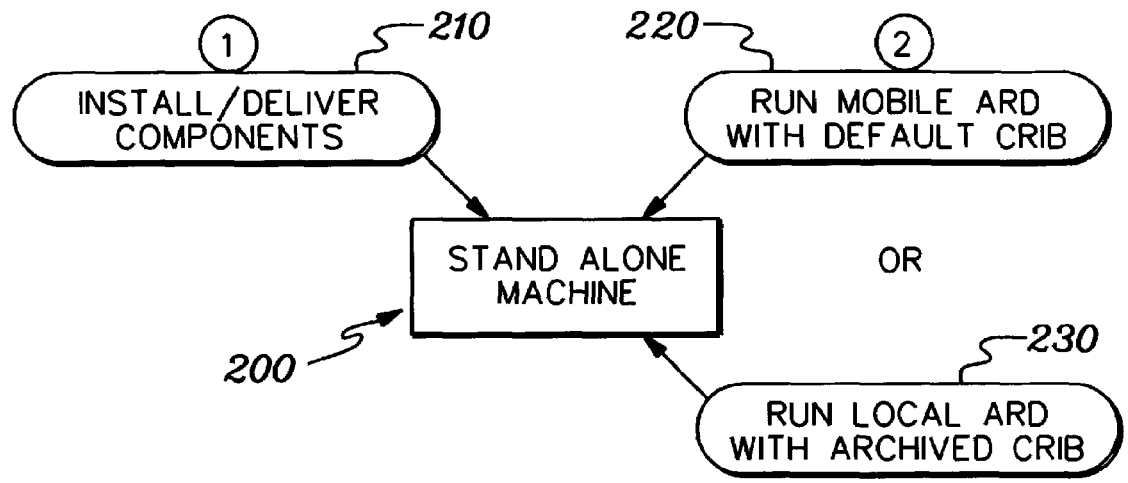
FIG. 2A depicts an exemplary process for providing and employing application interface facilities in accordance with an aspect of the present invention.
Figure 2B:
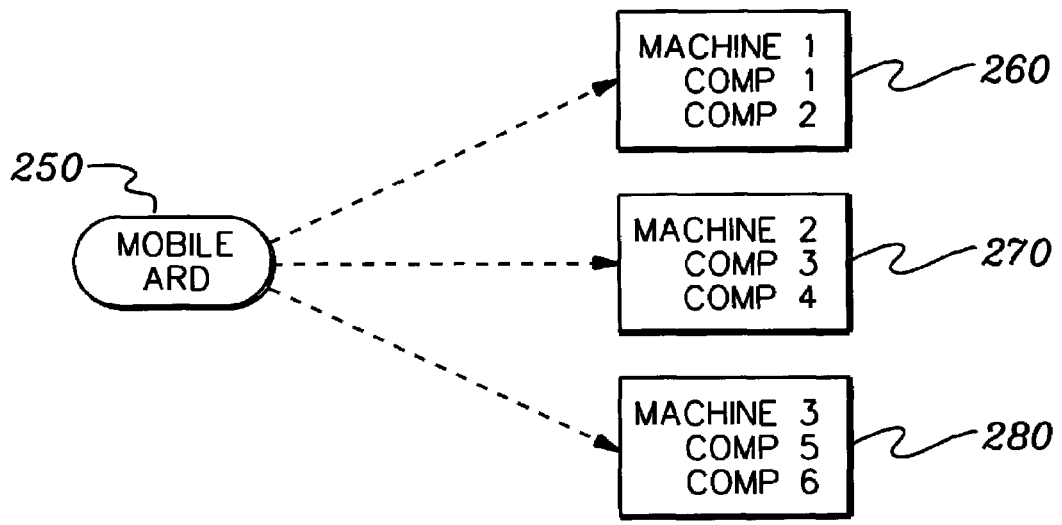
FIG. 2B depicts an example of a mobile application runtime driver (ARD) which can be employed on various computing machines, in accordance with an aspect of the present invention.

FIGS. 2A & 2B depict different examples of the environments within which the software component integration facility described herein can be employed. In FIG. 2A, a stand alone machine 200 receives in a first step the software components 210 to be integrated. In a second step, a mobile application runtime driver (ARD) can be run with a default component runtime integration box (CRIB) 220 or, by way of further example, a local ARD could be run with an archived CRIB 230.

In FIG. 2B, a mobile ARD 250 is shown employed on multiple computing machines 260, 270 & 280. The mobile ARD 250 can be employed in facilitating integration of software components 1 & 2 on machine 1, the integration of components 3 & 4 on machine 2 and the integration of components 5 & 6 on machine 3.

Figure 3:
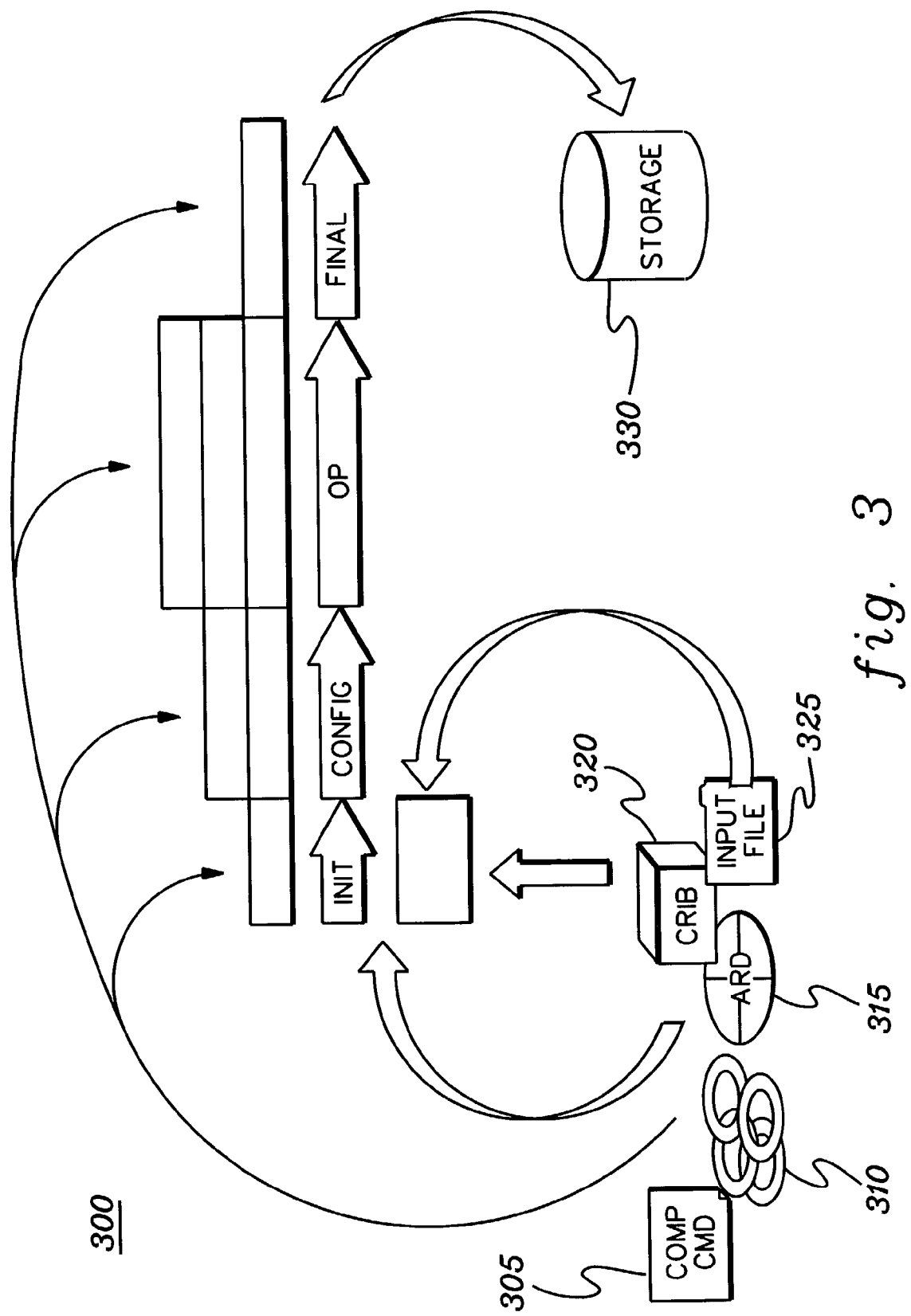
FIG. 3 depicts an overview embodiment of an application integration facility, its components, and the runtime environment within which software components are integrated pursuant to the integration facility, in accordance with an aspect of the present invention.

FIG. 3 depicts an overview embodiment of a software component integration facility 300 in accordance with an aspect of the present invention. In this embodiment, component commands 305 are inputs for and contained within software components 310, shown loaded into separate stages, labeled INIT, CONFIG, OP, and FINAL. The software components are assembled at runtime into an application. Two of the common components provided with the integration model are the ARD 315 and the CRIB 320. The ARD 315 functions as the backbone for the application onto which components are plugged into at different stages of the running application. The ARD provides a means of controlling the flow of the application, similar to a state machine. At the beginning of a stage, the ARD reads an input file 325 to determine which software components will be loaded. If desired, the ARD can be extended by adding more stages then the INIT, CONFIG, OP, and FINAL stages noted above. The CRIB 320 may contain a default input file which tells the application which components to load in the absence of a user provided input file. The user provided input file 325 would be provided by the application programmer. Thereafter, application workflows depend on the input files and stages of the ARD. As explained herein, the CRIB also contains a service register for components to publish their services and for other components to access those services. Once working in one environment, the CRIB can be readily carried over to other environments. The history of the executed components and methodologies can be stored in persistent storage 330 with completion of the application, for example, for subsequent test analysis of the application and/or software components.

Figure 4:
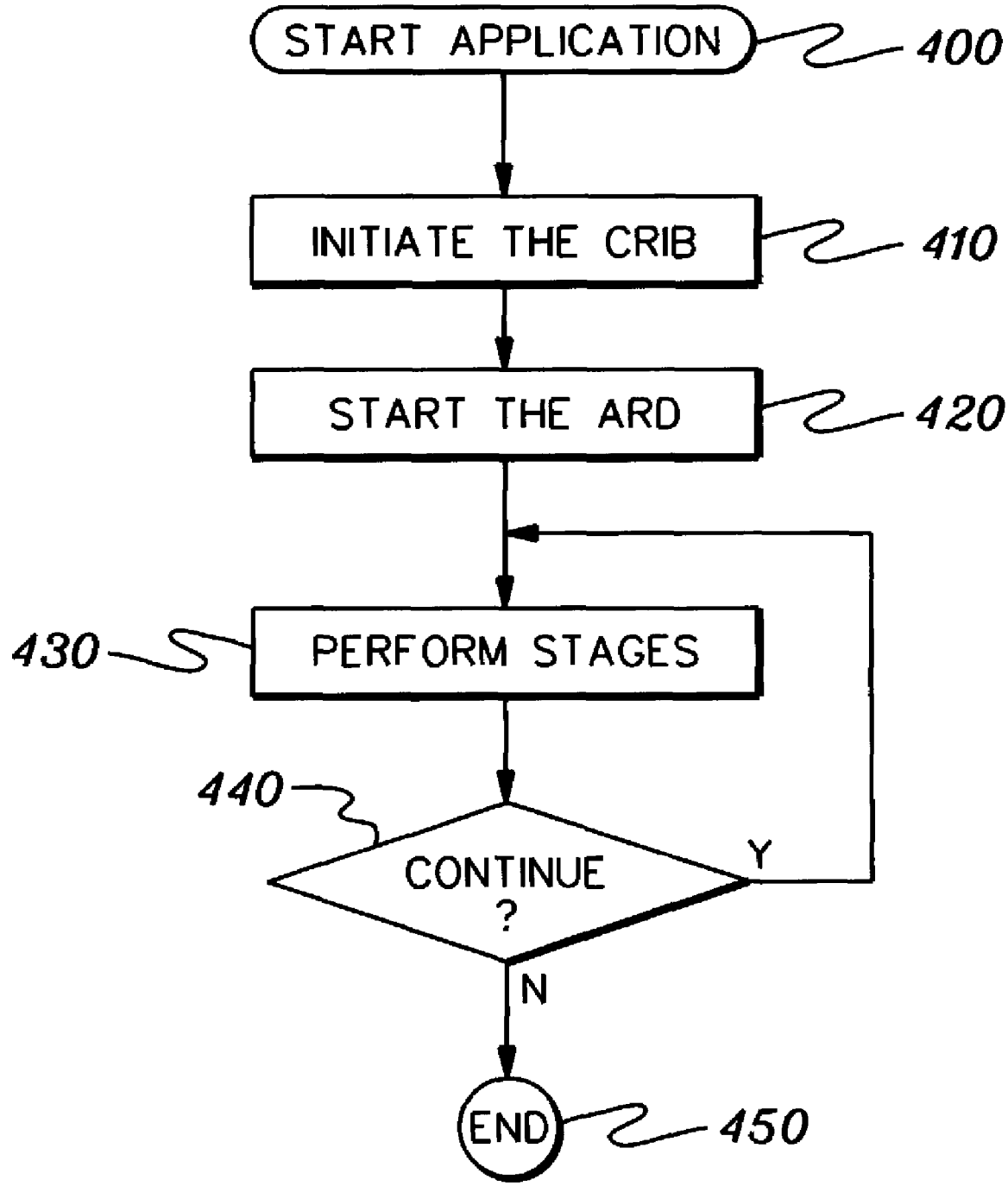
FIG. 4 is a flowchart of one embodiment of a process for integrating software components employing an application integration model in accordance with an aspect of the present invention.

FIG. 4 is a flowchart of one process embodiment of a software component integration facility in accordance with an aspect of the present invention. The integration process begins by starting a bare application 400 and initiating the CRIB 410. Thereafter, the ARD is started 420 and the stages of the ARD 430 are performed. Once the final stage has been reached, the lifecycle of the application is completed 450.

Figure 5:
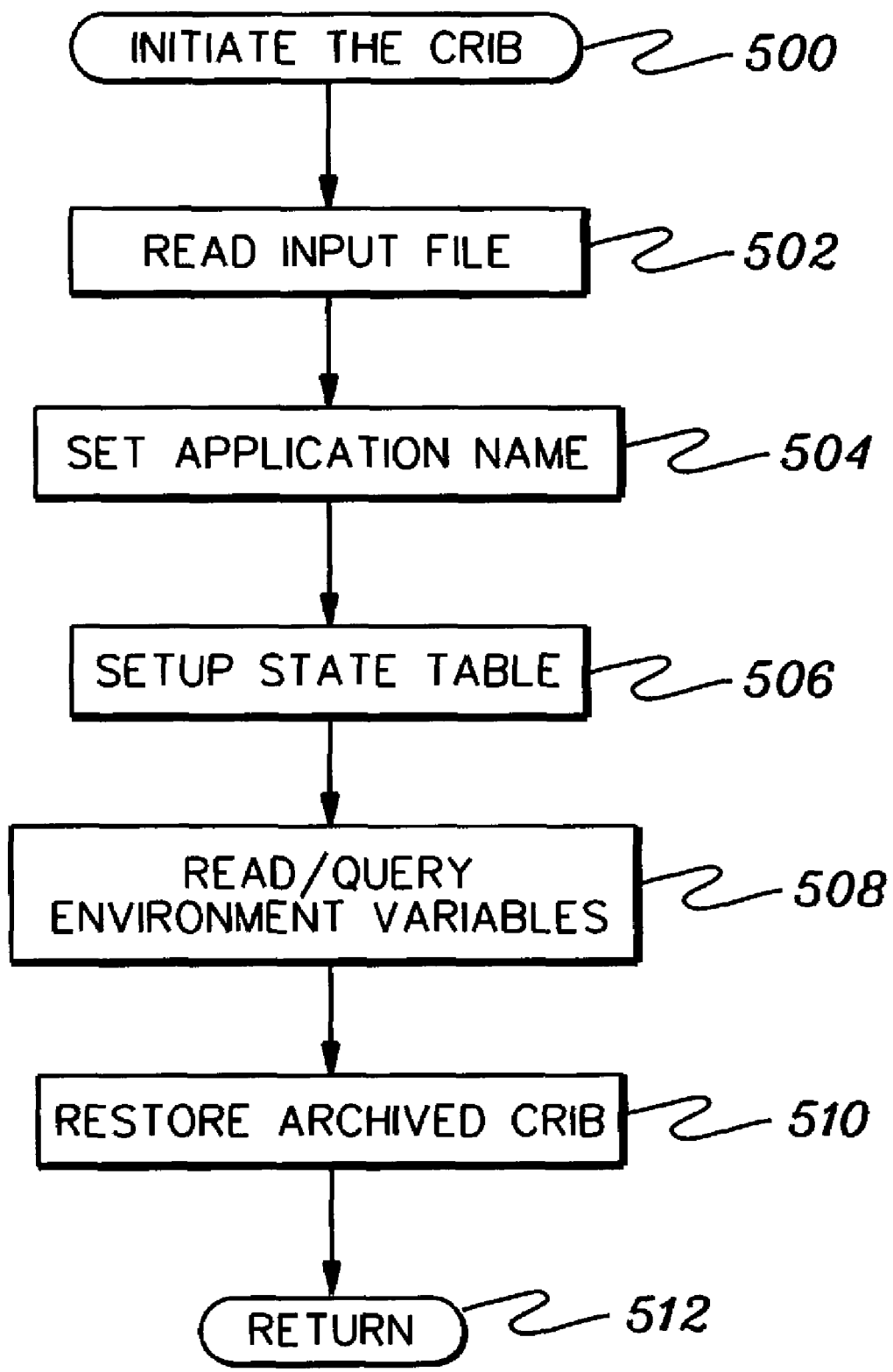
FIG. 5 is a flowchart of one embodiment of component runtime integration box (CRIB) processing, in accordance with an aspect of the present invention.

FIG. 5 depicts one example of processing for initiating the CRIB 500. Initiation begins with reading in the input file 502, which contains a list of software component names to be loaded into this application. The software components include the stages that the individual components should execute within, as well as certain key words that enable the application to read in a command and execute that command. The application name is set. This name may comprise a default name or a name input through the input file 504. The state table within the CRIB is then set up 506.

Figures 7A, 7B:
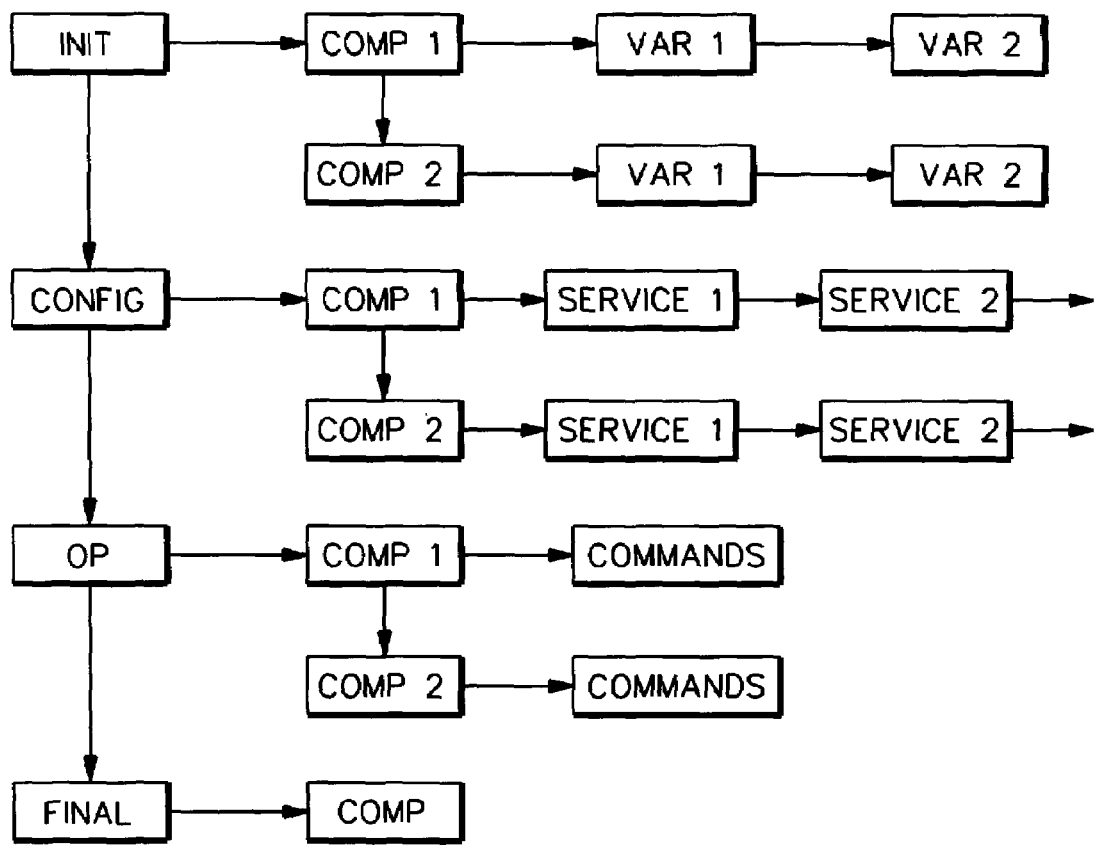
FIG. 7A depicts one embodiment of a time table maintained by the CRIB component of the application integration facility, in accordance with an aspect of the present invention.
FIG. 7B depicts one embodiment of a state table maintained by the CRIB component of the application integration facility, in accordance with an aspect of the present invention.

FIG. 7B depicts one example of a state table, which can be considered analogous to a state machine. In the example of FIG. 7B, four stages are identified, namely, the INIT, CONFIG, OP and FINAL stages. Software components execute at the various stages and include environment variables, as well as providing services and commands, depending on the stage of the component as shown in the figure.

Continuing with FIG. 5, processing reads or queries for environment variables 508, such as execution path, operating system environment, etc. This is followed by processing restoring an archived CRIB 510, if available. As noted above, the CRIB can be archived anywhere within the file system, assuming that the application has been running in this environment before. Thereafter, processing returns to the point of call 512.

Figure 5A:
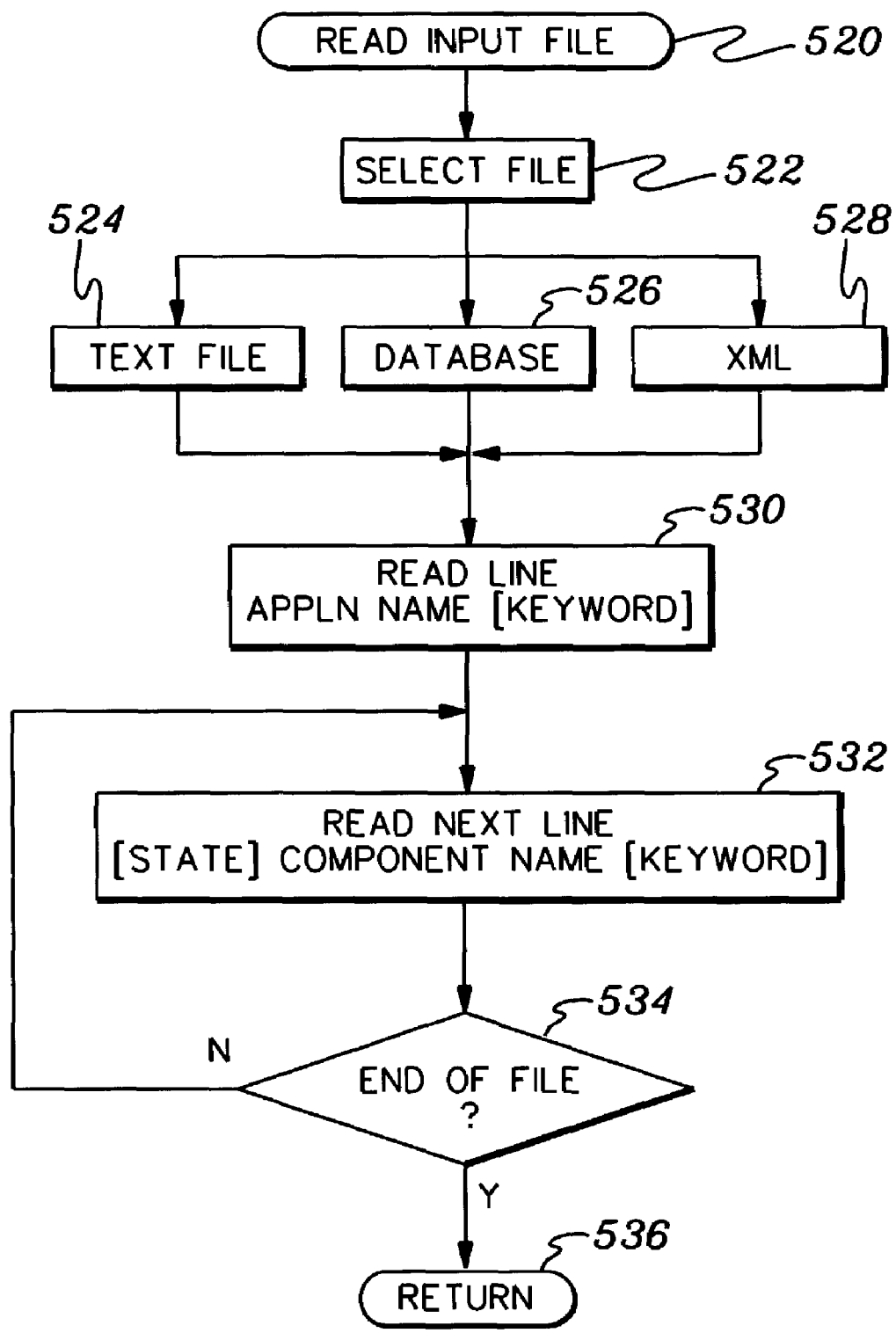
FIG. 5A is a flowchart of one embodiment of input file processing implemented by the processing of FIG. 5, in accordance with an aspect of the present invention.

FIG. 5A presents one example of processing for reading an input file 520, which can be employed by the processing of FIG. 5. A file is initially selected 522. This file may be in any one of various data formats, such as a text file 524, a database 526 or an XML file 528, etc. A first line of the file is read 530, which includes the application name followed by a keyword. The application name is the initial software component to be loaded, and the keyword can comprise one or more application parameters. Subsequent lines in the file are then read 532 which may include component names preceded by a state or stage of the software component, and followed by keywords which may comprise parameters such as names of methods that the components provide. Processing then determines whether all lines of the file have been read 534. If "no", processing continues to read a next line 532. Once all lines have been read, processing returns to the point of call 536.

Figure 5B:
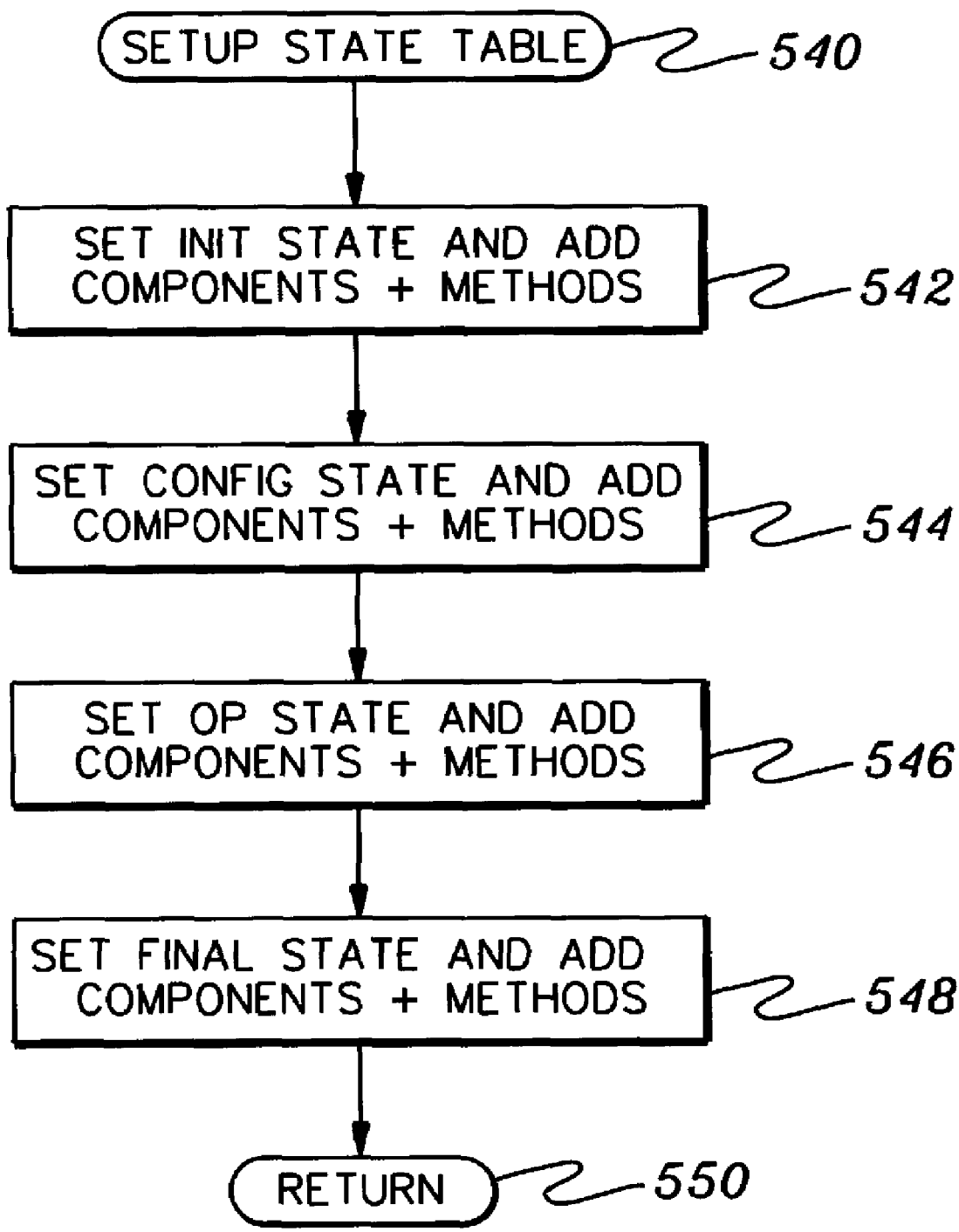
FIG. 5B is a flowchart of one embodiment of state table setup processing implemented by the processing of FIG. 5, in accordance with an aspect of the present invention.

FIG. 5B depicts one example of processing employed for setting up a state table within the CRIB 540. Each of the various stages is set within the table, and components and methods for the stages are provided. For example, the INIT state is set, and components and methods for that state are added 542. This is followed by the CONFIG state 544, the OP state 546, and the FINAL state 548. Thereafter, processing returns to a point of call within the overview CRIB initiation process of FIG. 5. Note that the methods added to the state table can identify the methods that a particular component provides, for example, "open" and "close". The processing of FIG. 5B essentially orders the information in the state table, such that each row identifies a particular software component. Each software component may provide multiple functions.

Figure 5C:
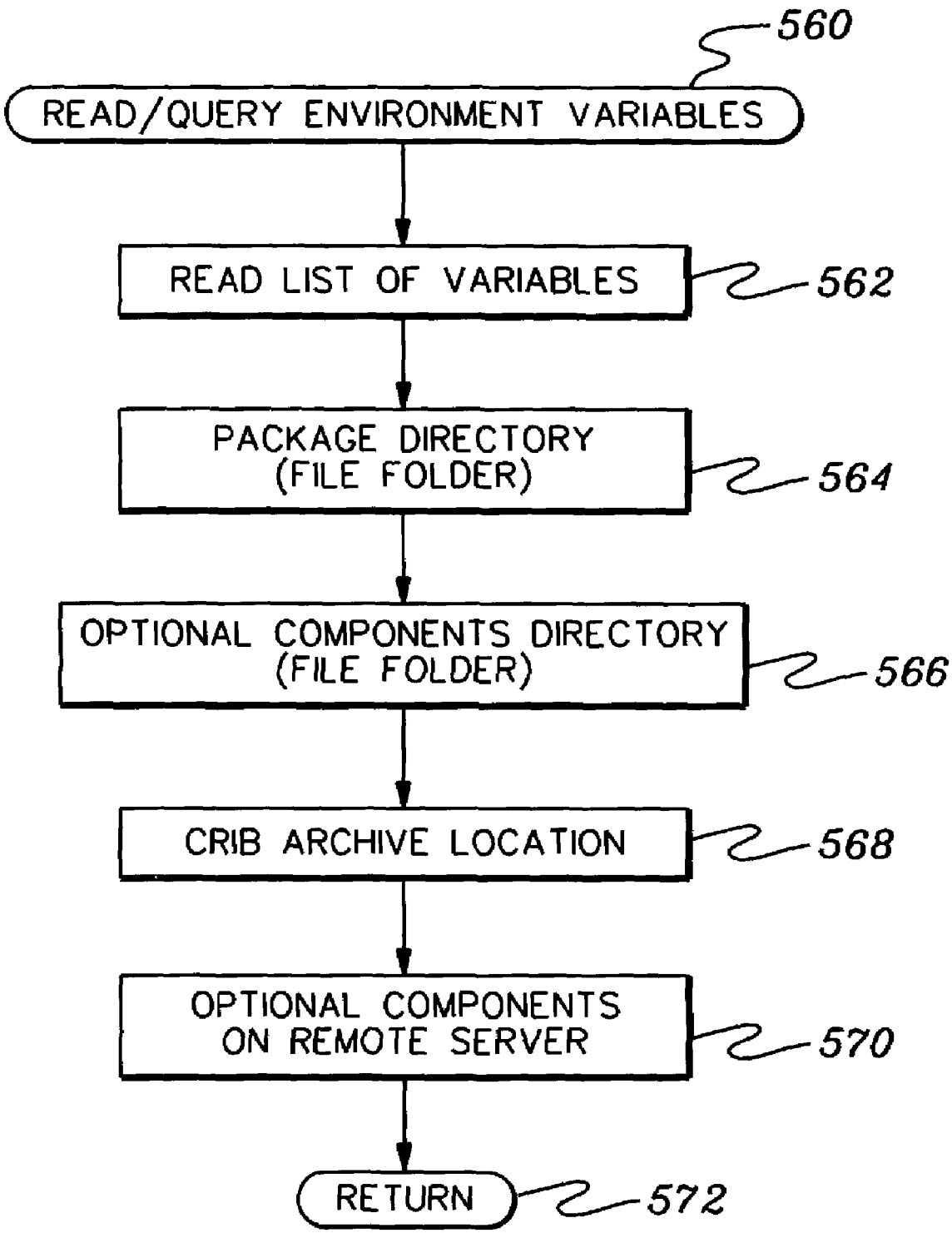
FIG. 5C is a flowchart of one embodiment of read/query environment variables processing implemented by the processing of FIG. 5, in accordance with an aspect of the present invention.

FIG. 5C depicts an overview of processing for reading or querying for environment variables 560. This processing begins by reading a list of variables 562 needed for the application to run, such as execution paths, user ids and processor names. The package directory 564 is then processed. This directory may comprise a default directory which instructs the application on where to load the various components. One or more optional components directories may also be provided 566 which would define additional search paths for a particular application. Processing then determines the CRIB archive location 568, assuming that the CRIB has been previously archived, and determines whether there are any optional components on one or more remote servers 570, e.g., whether the application will need to extend the search into a network of servers to extract the components. Thereafter, processing returns to the point of call 572.

Figure 5D:
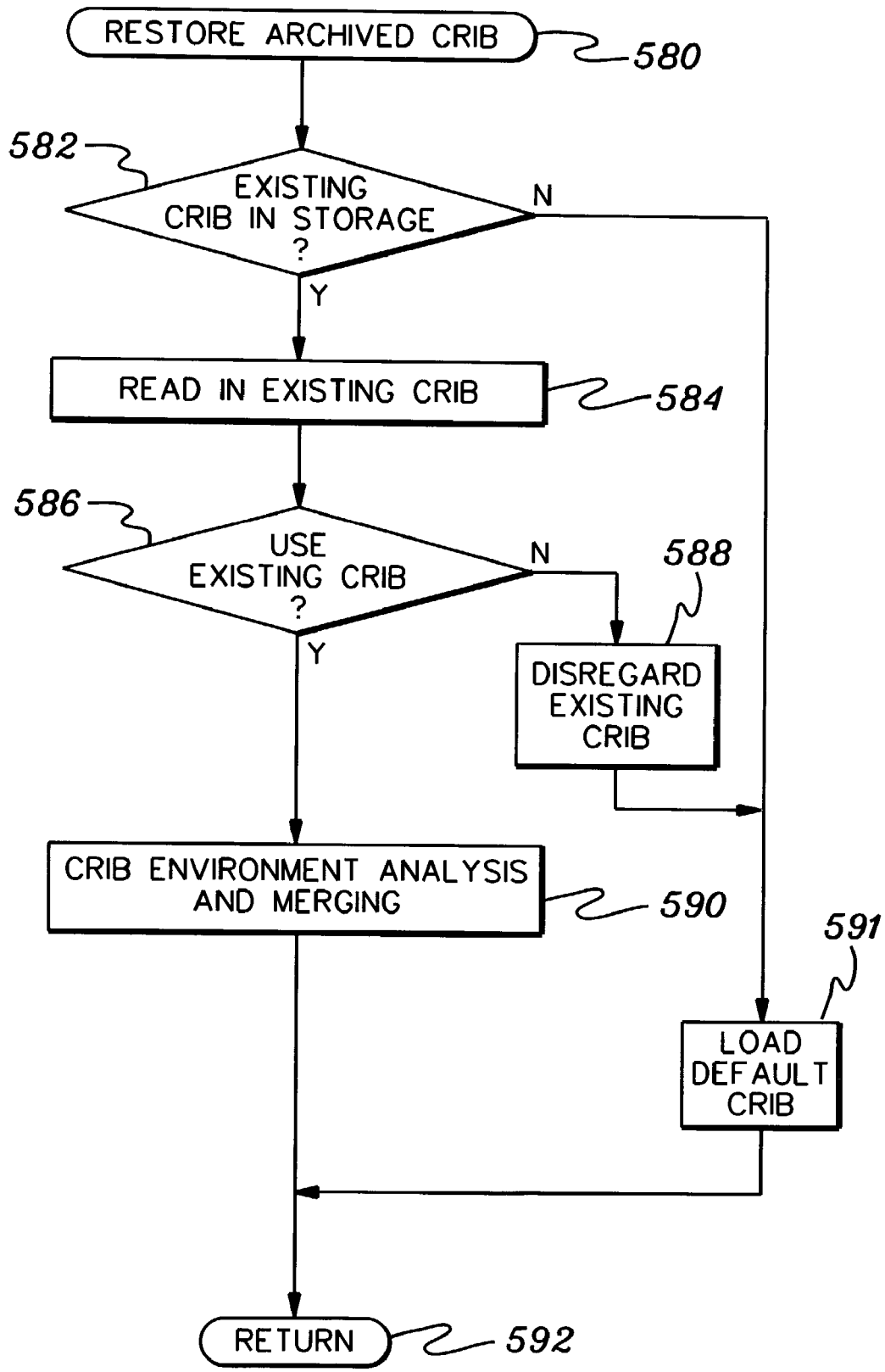
FIG. 5D is a flowchart of one embodiment of restore archived CRIB processing which can be used by the processing of FIG. 5, in accordance with an aspect of the present invention.

In FIG. 5D, a processing example is provided for restoring an archived CRIB 580. In this example, processing initially determines whether a CRIB exists in storage 582. If "no", then the processing loads the default CRIB 591 and returns to the point of call 592. Otherwise, the existing CRIB is read 584, and processing determines whether to use the existing CRIB 586. If "no", then processing is instructed to disregard the existing CRIB 588 and load the default CRIB 591 before returning. Assuming that the existing CRIB is to be employed, then CRIB environment analysis and merging of variables 590 is performed. For example, if the existing CRIB has additional environment variables than the input file, then those variables can be merged into the new CRIB in order to facilitate processing. Thus, the state tables of the existing CRIB and the new CRIB can be compared, as well as the number and names of the components within the state tables. Processing then returns to the point of call.

FIGS. 6A–6D depict one embodiment of processing for integrating software components in accordance with an aspect of the present invention. Processing begins by starting the ARD 600 and starting a time table 602. One example of a time table is depicted in FIG. 7A. The time table includes the history of software component loads and method calls, which can subsequently be used for debugging of an integrated application. The time stamp refers to the time at which a component is loaded and/or a method is called.

Processing next loads an INIT component from the CRIB state table 604. Again, a representation of the CRIB state table is depicted in FIG. 7B. An entry is then inserted into the time table indicating calling of this component 606. Processing thereafter determines whether the initial component comprises a request to set an environment variable 608. If "no", then processing determines whether there is a next INIT component 610. If "no", processing continues as discussed below in connection with FIG. 6B. Otherwise, processing loops back to load the next INIT component from the CRIB state table.

If a request to set an environment variable is made, then processing determines whether the environment variable already exists 612. If "no", then the variable is created 614. If "yes", then the current value of the environment variable is saved 616, and the new value is set 618. Processing then determines whether there is an additional request for setting an environment variable 620. If so, then processing loops back to determine whether the environment variable already exists and proceeds as set forth above. If there are no additional requests to set environment variables, then processing determines whether there is a next INIT component.

Figure 6A:
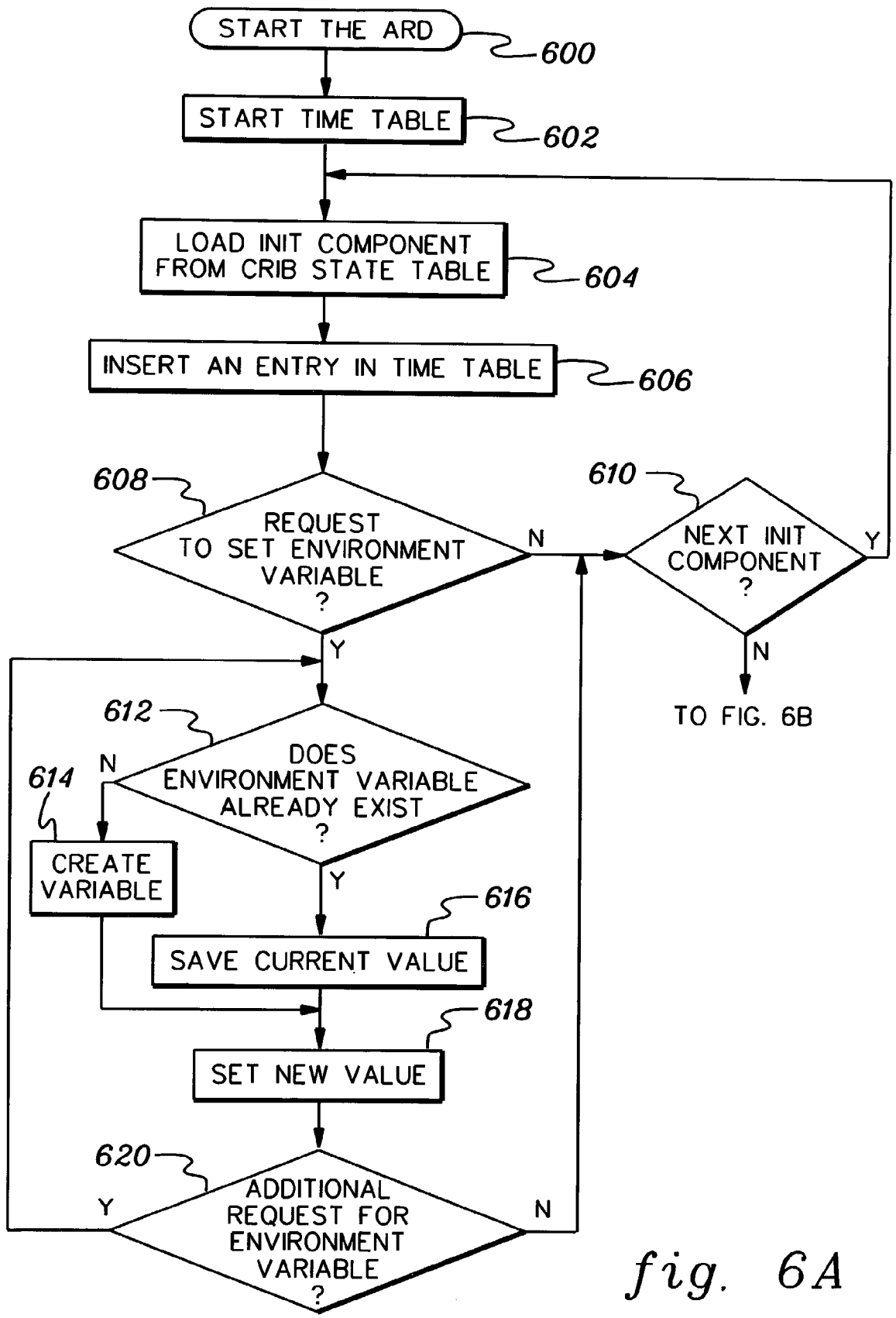
FIGS. 6A–6D depict a flowchart embodiment of start application runtime driver (ARD) component processing which can be employed in the application integration facility of FIG. 4, in accordance with an aspect of the present invention.
Figure 6B:
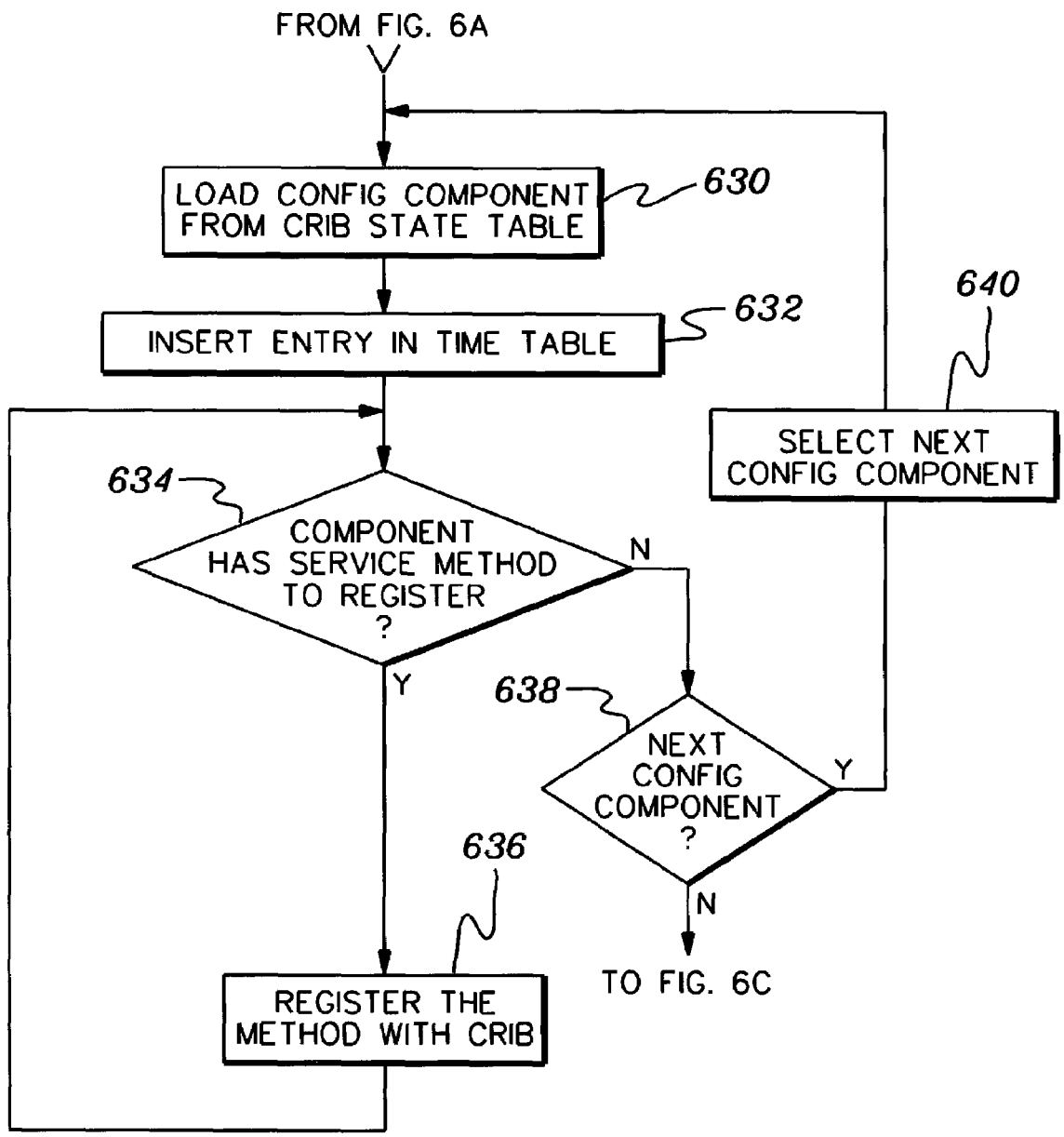

FIG. 6B depicts one example of processing for loading a CONFIG component from the CRIB state table 630. Initially, processing inserts an entry into the time table 632 and then determines whether the component has a service method to register in the service registry maintained by the CRIB 634. FIG. 7C depicts one example of a CRIB service registry, which essentially includes a listing of available methods, and a pointing to particular components which provide those methods. Thus, when other components request this particular method, those components will know where and which component to load. If the component has a service method to register, the method is registered within the service registry of the CRIB 636, and processing loops back to determine whether the component has an additional method to register. Once all methods have been registered, processing determines whether there is a next CONFIG component to be processed. If so, then the next CONFIG component is selected 640 and loaded from the CRIB state table 630. Once all CONFIG components have been processed, processing continues with the flowchart of FIG. 6C.

Figure 6C:
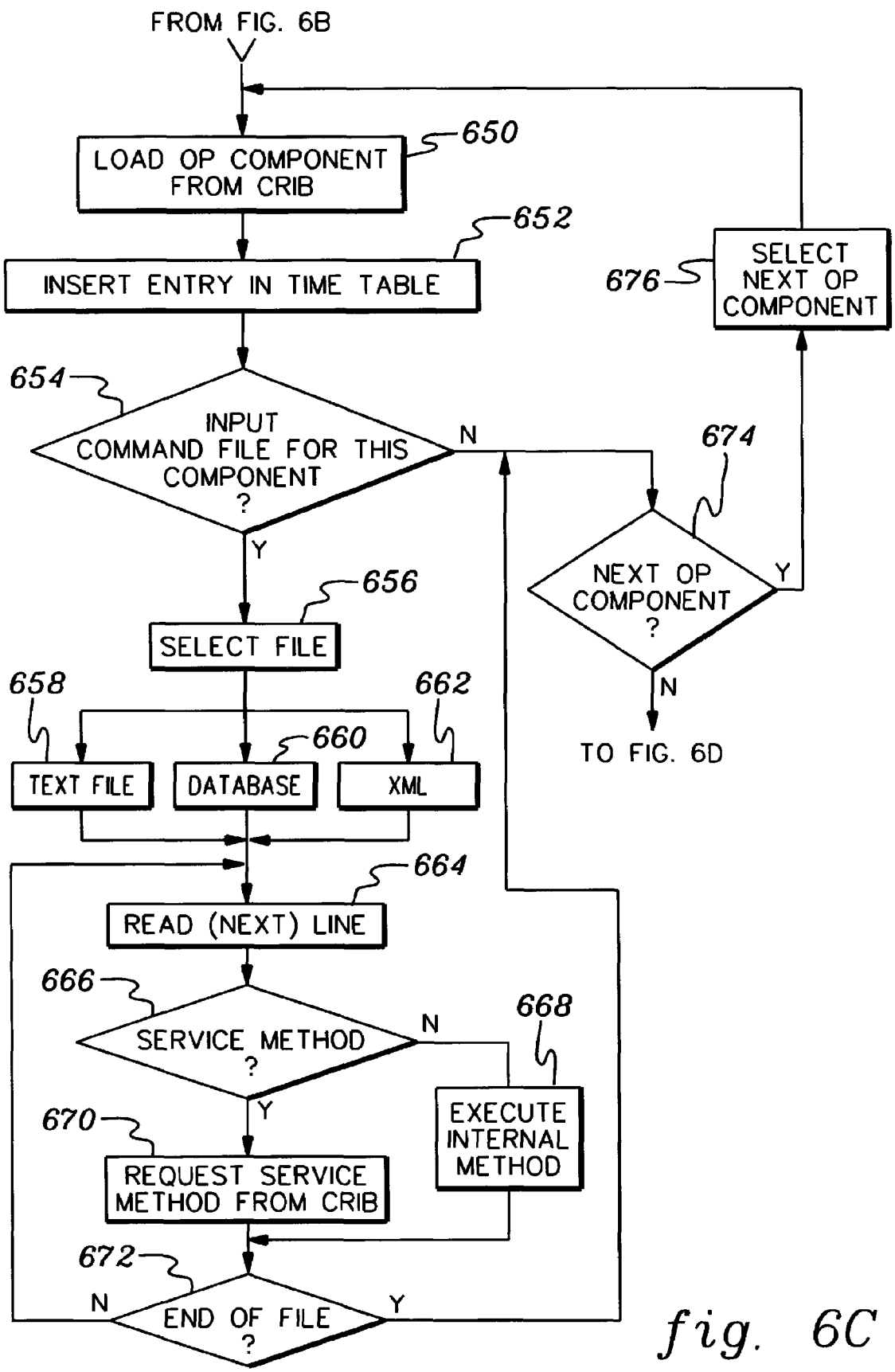
Figure 7C:
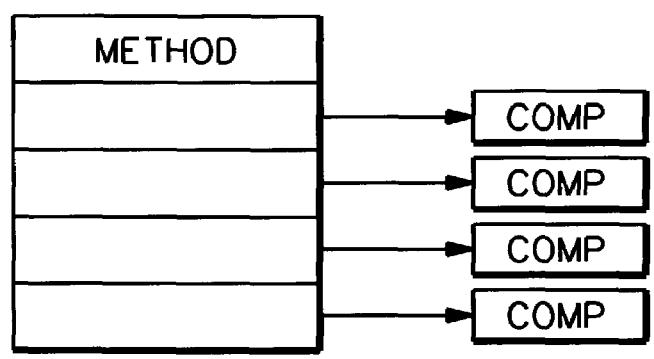
FIG. 7C depicts one embodiment of a service registry maintained by the CRIB component of the application integration facility, in accordance with an aspect of the present invention.

In FIG. 6C, an OP component is loaded from the CRIB 650 state table and an appropriate entry is inserted into the time table 652. Processing then determines whether there is an input command file for this component 654. If yes, then the input file is selected 656. By way of example, this input file may be one of a text file 658, a database file 660 or an XML file 662. A line of the file is read 664, and processing determines whether the command is a service method or an internal method 666. If a service method, then processing requests the service method from the CRIB 670. Otherwise, processing executes the internal method 668. Thereafter, processing determines whether an end of file has been reached. If "no", then a next line of the file is read 672. If "yes", then processing determines whether there is a next OP component 674. If so, a next OP component is selected 676 and processing loops back to load the new OP component 650. Note that the input file lists the input commands that would be executed by a particular OP component. For example, a service method may be listed in this command file, which directs the component on how to proceed once it starts executing.

Figure 6D:
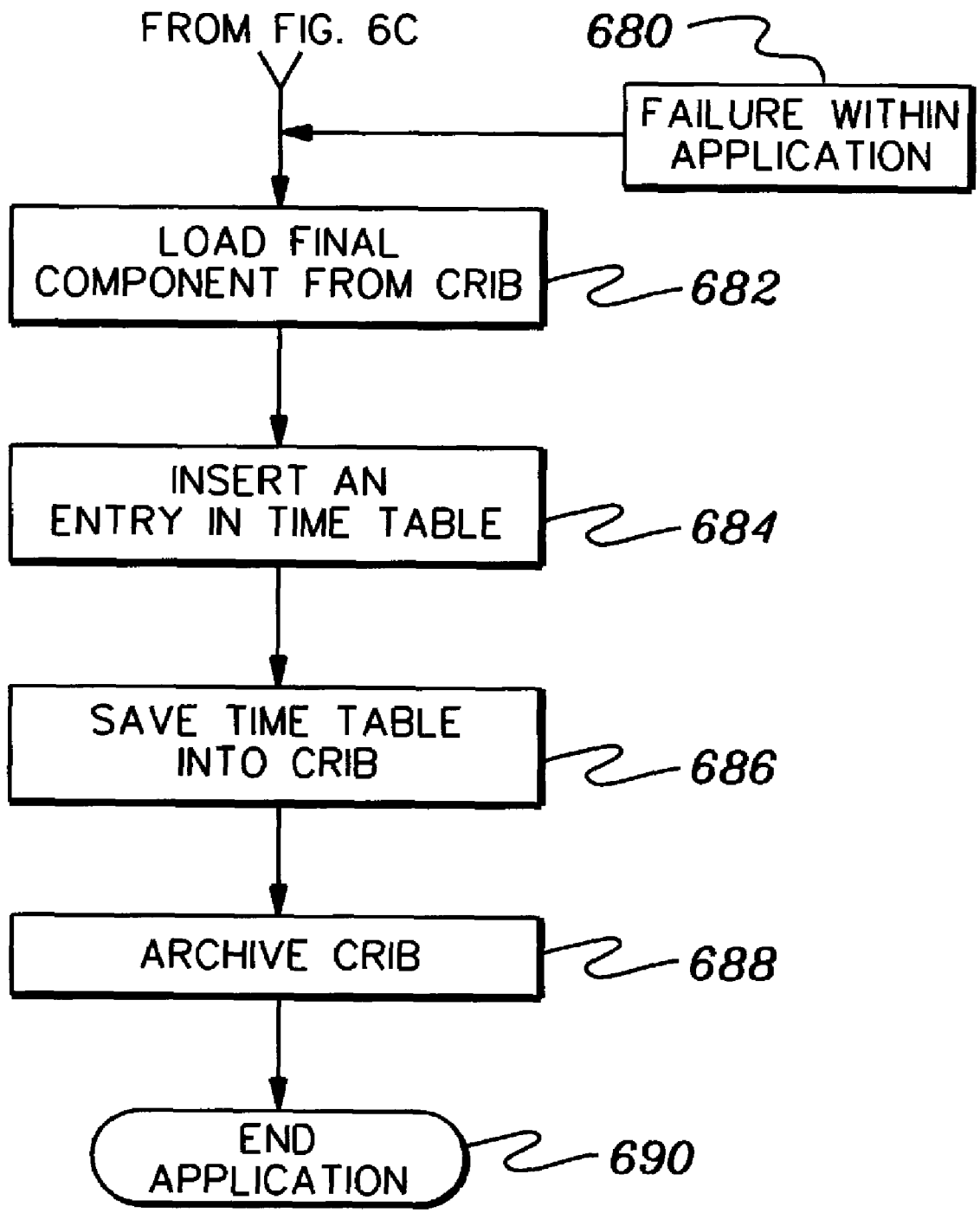

Processing for the final stage is depicted in FIG. 6D. The final stage is entered upon completion of the OP component processing stage or with failure within the application 680. The final component is loaded from the CRIB 682, and an entry is inserted into the timetable with the loading of the component 684. The timetable is then saved into the CRIB 686, and the CRIB is archived 688, for example, in storage on a disk. This completes the lifecycle of the application 690.

As discussed above, one concept presented herein is that the component software application is packaged with a default Component Runtime Integration Box (CRIB) that should give enough information for the application to start for the first time in a new runtime environment. However, there is a risk that the startup will fail because of a significant difference in this new environment. There are various ways of testing the environments and the components while integrating so that a component software application can autonomously adapt to a new environment.

First, the Application Runtime Driver (ARD) can load an environment analysis component that knows the internals of the CRIB. Once loaded, this analysis object makes system calls or native calls to gather required environment information in order to do comparisons with the information in the prepackaged CRIB. Depending on the levels of complexity of the implementation, the CRIB can be adjusted to the environment. Alternatively, the results of the analysis can be stored and used the next time the application starts. From the point of view of this test driver, starting up is the most important step in running an application. It is important to learn from the previous failures(s).

Once started, the test driver allows software components to be loaded into the application one at a time for testing purposes. From the above discussion, it should be noted that, each component takes on a role when it is loaded into the application memory. Based on these roles, each component can be tested to assure the correctness of its basic behaviors. For instance:

INIT component
CONFIG component
OPER component
FINAL component

The input file to the ARD is a new idea in converting tests of application interfaces to testing the component's context dependency, without changing code. As noted above, the input file contains the names of the components to be loaded, together with other contexts. In conjunction with dynamic loading of components and dynamic calling of methods, all that is needed is changing the input file for changing test cases or test scenarios. In other words, the input file provides users and testers the means of testing only what is needed to be tested.

Also from the above discussion, the ARD provides the frame of reference for the above four stages into which the components will be loaded. This test driver expands the ideas by providing a test component to test a component that is loaded. The following are certain fundamental test cases that can be implemented with this model, in general:

Testing component relation: In general, the component that provides services has to be loaded first. Then, those components that call (or use) these services can be loaded. By loading one component at a time, the order of loading can be in the tester's control for testing purposes.

Repetition: There are two aspects of repetition that the ARD can provide for testing. One, the ability of repeating the entire test cases by just rerunning the ARD with the same input file. Two, the ability of repeating the tests of a component can be implemented in the input file so that a component can be repetitively tested.

Trial-and-Error: One aspect of component integration as presented herein is that there is no source code modifications. Since a component is loaded dynamically, the ARD can be implemented so that if it encounters problems loading one component, it can try to load a different component with similar or less functionality.

The end results of these runtime integration tests can be presented into a certain confidence level for a particular component, i.e., how much success or failure this component has had. In return, this is a factor for the component to be reused in the future.

Analyzing and Adapting to New Runtime Environment:

The ability of analyzing and comparing the CRIB with the runtime environment opens up the possibility of an application adapting to new environment by itself. Since the application can load the components dynamically at runtime, it can adapt to the new environment by just loading different components, i.e., assuming those components are available from the package. This will work well when the component software integrator knows in advance the different environments which the application can run in. The component software integrator includes all the various components in the package. But the application only loads the components it requires for a specific environment.

Allowing Human User Intervention in Case of Application Failures:

There is a risk of application failure when pre-built components are assembled into an application at runtime. In reality, this can be due to a new environment that the component has never been run in before. This might occur because the tests in the development environment do not guarantee coverage of all existing environments; not to mention any new environments that are introduced after the components are written. Also, in the case of testing, a component might be missing or not functional as specified.

On-the-fly Integration Testing at Runtime:

In order for pre-built software components to be widely used and reused, they have to be used in binary form with none or minimal modification. That is the premise for this kind of integration testing at runtime. Based on the assumption that the application can analyze the runtime environment at startup, essential local variables are known. Therefore, the necessary test logic can be reduced to a simplest form. The tests should not be effected by the complexity of the code or how the code is written. Instead, the tests depend on how well the components integrate with other components and how confident the user perceives when the application starts and runs.

There are no code modifications just for testing purposes because the component names and methods can be specified in the input file. Instead of going back and forth with source code modifications and retests (can't do this with pre-built components), the idea here is to input different contests to invoke the objects or methods in different ways. And, if all or some of them fail, it would be better to pick a different component and go on with the testing. This model of testing would assume and promote the abundance of pre-built components.

Descriptions of How the Test Driver Works:

In addition to the above discussion, the test driver could be extended to include the following components:
Environment and CRIB analyzer (ECA)
Component relational tester (CRT)
Repetition and Trial-and-error tester (RTT)

After the application loads its Application Runtime Driver, the following steps could be performed:
1. The ECA is loaded and its methods are run. This step determines if the runtime environment is acceptable for the application to continue to run.
2. The CRT is loaded.
3. The RTT is loaded.
4. The remaining components are loaded based on the contents of the input file.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

Appendix

```java
// File: Application.java
// This is the main application that initiates the Application Runtime
// Driver (ARD) and the Component Runtime Integration Box. After
// initiated, the ARD drives the application to completion.

import java.io.*;

public class Application
{
  private AppObserver appObs;
  private StateManager stateMgr;

public Application()
  {
    appObs = new AppObserver();
    stateMgr = new StateManager(appObs);
    stateMgr.activateInit();

while (!stateMgr.stopped()) {
      stateMgr.execute();
    }
  } static public void main( String[] argv )
  {
    new Application();
  }
}

// File: AppObserver.java
// This is basically the CRIB in a simple implementation.

import java.io.*;
import java.util.Observer;
import java.util.Observable;

public class AppObserver implements Observer
{
  private static RTEnv appEnv = null;
  private static BufferedReader appReader = null;

public AppObserver()
  {
    appEnv = new RTEnv();
  } public AppObserver(RTEnv env)
  {
    appEnv = env;
  } public BufferedReader appReader()
  {
    return appReader;
  } public void registerApp(String app)
```

```java
{
  appEnv.appName(app);
}
public void registerAppObj(Object obj)
{
  appEnv.appObj(obj);
}
public void registerInput(String input)
{
  appEnv.appInput(input);
}
public void registerReader(BufferedReader reader)
{
  appReader = reader;
}
public void registerLogic(String logic)
{
  appEnv.logic(logic);
}
public void registerOutput(String output)
{
  appEnv.appOutput(output);
}
public String appName()
{
  return appEnv.appName();
}
public String appInput()
{
  return appEnv.appInput();
}
public String logic()
{
  return appEnv.logic();
}
public String appOutput()
{
  return appEnv.appOutput();
}
public Object appObj()
{
  return appEnv.appObj();
}
public void update(Observable obs, Object obj)
{
  System.out.println("Update...");
}
}

// File: RTEnv.java
// The environment variables are part of the CRIB.  And, they are
// observable.
```

```java
import java.util.Observable;

public class RTEnv extends Observable
{
  private static String appName = null;
  private static String appInput = null;
  private static String compName = null;
  private static String appOutput = null;
  private static String logic = null;
  private static Object appObj = null;

public String appName()
  {
    return appName;
  } public String appInput()
  {
    return appInput;
  } public String compName()
  {
    return compName;
  } public String logic()
  {
    return logic;
  } public String appOutput()
  {
    return appOutput;
  } public Object appObj()
  {
    return appObj;
  } public void appName(String name)
  {
    appName = name;
  } public void appInput(String input)
  {
    appInput = input;
  } public void compName(String name)
  {
    compName = name;
  } public void logic(String cmd)
  {
    logic = cmd;
  } public void appOutput(String output)
  {
```

```java
    appOutput = output;
  }
  public void appObj(Object obj)
  {
    appObj = obj;
  }
}

// File StateManger.java
// This is basically the ARD, which is implemented as a state machine.

import java.io.*;

public class StateManager
{
  private String appName;
  private String compName;
  private String inputFile;
  private RTState currentState;
  private boolean stopped = false;
  RTStateINIT iState;
  RTStateGROW gState;
  RTStateLIVE lState;
  RTStateAWAY aState;

public StateManager(AppObserver appObs)
  {
    iState = new RTStateINIT(appObs, this);
    gState = new RTStateGROW(appObs, this);
    lState = new RTStateLIVE(appObs, this),
    aState = new RTStateAWAY(appObs, this);
    currentState = iState;
  } public void activateInit()
  {
    currentState = iState;
  } public void activateGrow()
  {
    currentState = gState;
  } public void activateLive()
  {
    currentState = lState,
  } public void activateAway()
  {
    currentState = aState;
  } public void changeApp(String app)
  {
    appName = app;
  } public void changeComp(String comp)
  {
    compName = comp;
```

```
    }
    public int execute()
    {
      return currentState.execute();
    }
    public void tryNext()
    {
      currentState.tryNext();
    }
    public void nextState()
    {
      currentState.nextState();
    }
    public void gotError()
    {
      currentState.gotError();
    }
    public void inputFile(String name)
    {
      inputFile = name;
    }
    public String inputFile()
    {
      return inputFile;
    }
    public boolean stopped()
    {
      return stopped;
    }
    public void stop()
    {
      stopped = true;
    }
}

// File: RTState.java
// All four or the Runtime states should implement these methods.

public abstract class RTState {
    public abstract int execute();
    public void tryNext() {}
    public void nextState() {}
    public void gotError() {}
}

// File: RTStateINIT.java
// Initialization State.

import java.io.*;

public class RTStateINIT extends RTState
{
    private AppObserver appObs;
    private StateManager stateMgr;
    private static int rc = 1;
```

```java
public RTStateINIT(AppObserver observer, StateManager mgr)
{
  appObs = observer;
  stateMgr = mgr;
} public int execute()
{
  File cfgFile = new File("app.txt");
  BufferedReader cfg = null;
  String appName = null;
  String inModule = null;
  String appLogic = null;
  String outModule = null;
  String input = new String("command.txt");

try
  {
    cfg = new BufferedReader(new InputStreamReader(
                    new FileInputStream(cfgFile)));
    appName = cfg.readLine();
    inModule = cfg.readLine();
    appLogic = cfg.readLine();
    outModule = cfg.readLine();
  } catch (FileNotFoundException e) {
    System.out.println("Can't find file " + cfgFile);
  } catch (IOException e) {
    System.out.println("Problem with reading input file");
  }

//System.out.println("Application Name: "+appName);
  //System.out.println("Application Input: "+inModule);
  //System.out.println("Application Logic: "+appLogic);
  //System.out.println("Application Output "+outModule);

appObs.registerApp(appName);
  appObs.registerInput(inModule);
  appObs.registerLogic(appLogic);
  appObs.registerOutput(outModule);

stateMgr.inputFile(input);
  nextState();
  return rc;
} public void nextState()
{
  stateMgr.activateGrow();
}
}

// File: RTStateGROW java
// The GROW State is also known as Configuration State.

import java.io.*;
import java.lang.reflect.Constructor;
import java.lang.reflect.Method;

public class RTStateGROW extends RTState
{
  private AppObserver appObs;
  private StateManager stateMgr;
  private static int rc = 1;
```

```java
public RTStateGROW(AppObserver observer, StateManager mgr)
{
  appObs = observer;
  stateMgr = mgr;
} public int execute()
{
  Class[] sign = {String.class};
  String[] param = {stateMgr.inputFile()};
  BufferedReader inputReader = null;

try
  {
    Class classObj = Class.forName(appObs.appInput());
    Constructor appInput = classObj.getConstructor(sign);
    Object obj = appInput.newInstance(param);
    Method filename = classObj.getMethod("filename", null),
System.out.println("Input File: " +
        (String)filename.invoke(obj,null));
                        Method reader = classObj.getMethod("reader", null);
    inputReader = (BufferedReader)reader.invoke(obj, null);
  } catch (ClassNotFoundException e) {
    System.out.println("Can't find class: " + appObs.appInput());
  } catch (Exception e) {
    System.out.println("Problem with method filename");
    e.printStackTrace();
  } appObs.registerReader(inputReader);
  nextState();
  return rc;
} public void nextState()
{
  stateMgr.activateLive();
}
}

// File: RTStateLIVE.java
// The LIVE State is also known as Operating State.

import java.io.*;
import java.lang.reflect.Method;

public class RTStateLIVE extends RTState
{
  private AppObserver appObs;
  private StateManager stateMgr;
  private static int rc = 1;

public RTStateLIVE(AppObserver observer, StateManager mgr)
  {
    appObs = observer;
    stateMgr = mgr;
  } public int execute()
  {
    Class logicClass = null;
    Class[] signature = {BufferedReader.class};
    Object[] param = {appObs.appReader()};
```

```java
    Object appObject = null;
    Object logicObject = null;
    //System out.println("Living..." + appObs.appName());

try
    {
      logicClass = Class forName(appObs logic());
      logicObject = logicClass.newInstance();
      Method reader = logicClass getMethod("reader", signature);
      reader.invoke(logicObject, param);
    } catch (ClassNotFoundException e) {
      System.out.println("Can't find class: " + appObs.logic());
    } catch (Exception e)
    {
      System.out.println("Can't instantiate instance for class. "
            + appObs.logic());
    }
    try
    {
      signature[0] = String.class;
      param[0] = appObs appName();
      Method instantApp = logicClass.getMethod("instantApp",
signature);
                    appObject = instantApp.invoke(logicObject, param);
      System.out.println("App Object: " + appObject.toString());
      Method execCmd = logicClass.getMethod("execAllCmd", null);
      execCmd.invoke(logicObject, null);
    } catch (NullPointerException e)
    {
      System.out.println("NullPointerException");
    } catch (Exception e)
    {
      System.out.println("Catch-all Exception"),
      e printStackTrace();
    } appObs.registerAppObj(appObject);
    nextState();
    return rc;
  } public void nextState()
  {
    stateMgr.activateAway();
  }
}

// File: RTStateAWAY.java
// The AWAY State is also known as the Finalization State.

import java.io.*;
import java.lang.reflect.Constructor;
import java.lang.reflect.Method;
import java.util.LinkedList;

public class RTStateAWAY extends RTState
{
  private AppObserver appObs;
  private StateManager stateMgr;
  private static int rc = 0;

public RTStateAWAY(AppObserver observer, StateManager mgr)
  {
```

```java
    appObs = observer;
    stateMgr = mgr;
  }
  public int execute()
  {
    Class[] signature = {LinkedList.class},
    Object[] param = {appObs.appObj()};

try
    {
      Class appClass = Class.forName(appObs.appOutput());
      Constructor appOutput = appClass.getConstructor(signature);
      Object obj = appOutput.newInstance(param);
      Method printAll = appClass.getMethod("printAll", null);
      printAll.invoke(obj, null);
    } catch (Exception e) {
      System.out.println("Can't print elements");
      e.printStackTrace(),
    }
    nextState();
    return rc;
  } public void nextState()
  {
    stateMgr.stop();
  }
}

// File: Queue.java
// This is an example of an CONFIG component.

import java.io.*;
import java.util.LinkedList;

public class Queue extends LinkedList
{
  public Queue()
  {
    super(),
  } public void enqueue(Object elem)
  {
    System.out.println("Enqueu:  " + elem);
    addLast(elem);
  } public Object dequeue()
  {
    Object elem = null;

elem = removeFirst();
    System.out.println("Dequeue. " + elem);
    return elem;
  } public String toString()
  {
    return "Queue";
  }
}
```

```
// File: Stack.java
// This is an example of a CONFIG component.

import java.io.*;
import java.util.LinkedList;

public class Stack extends LinkedList
{
  public Stack()
  {
    super();
  } public void push(Object elem)
  {
    System.out.println("Push: " + elem);
    addLast(elem);
  } public Object pop()
  {
    System.out.println("Pop"),
    return removeLast(),
  } public String toString()
  {
    return "Stack";
  }
}

// File: ReadFile.java
// This is an example of CONFIG component.

import java.io.*;

public class ReadFile
{
   private String filename = null;
   private BufferedReader in = null;
   private String line;

public ReadFile(String name)
   {
     filename = name;
     try
     {
       in = new BufferedReader(new InputStreamReader(
                       new FileInputStream(filename)));
     } catch (FileNotFoundException e) {
       System.out.println("Can't find file: " + filename);
       e.printStackTrace();
     }
   } public String readLine()
   {
     try
     {
       line = in.readLine(),
     } catch (IOException e) {
       System.out.println("Problem with reading input line"),
       e.printStackTrace();
```

```
    }
    return line;
  } public void prLine()
  {
    System.out.println(line);
  } public void filename(String file)
  {
    filename = file;
  } public String filename()
  {
    return filename;
  } public BufferedReader reader()
  {
    return in;
  }
}

// File: IterateCmd.java
// This is an example of an Operating component.

import java.io.*;
import java.lang.reflect.Method;
import java.util.StringTokenizer;

public class IterateCmd
{
  private BufferedReader reader = null;
  private String[] param = {new String("")};
  private Object appObj = null;
  private Class appClass = null;
  private String nextCmd = null;
  private int countParam = 0;

public void reader(BufferedReader r)
  {
    reader = r;
  } public Object instantApp(String name)
  {
    try
    {
      appClass = Class.forName(name);
      appObj = appClass.newInstance();
    } catch (ClassNotFoundException e) {
      System.out.println("Can't find class: " + name);
    } catch (Exception e)
    {
      System.out.println("Can't instantiate new instance for class:"
              + name);
    }
    return appObj;
  }
```

```
public Object instantApp(Class name)
{
  try
  {
    appObj = appClass.newInstance();
  } catch (Exception e)
  {
    System.out.println("Can't instantiate class object");
  }
  return appObj;
}
public void appObject(Object app)
{
  appObj = app;
}
public String nextCmd()
{
  String line = null;
  int tokens = 0;

try
  {
    line = reader.readLine();
  } catch (IOException e)
  {
    System.out.println("Problem reading command");
  }
  if (line == null) { return null; };
  StringTokenizer strToken = new StringTokenizer(line);
  nextCmd = null;
  if ((tokens = strToken.countTokens()) > 0)
  {
    nextCmd = strToken.nextToken(),
  }
  param[0] = null;
  countParam = 0,
  while (strToken.hasMoreTokens())
  {
    param[countParam++] = strToken nextToken();
  } return nextCmd;
}
public void execCmd()
{
  Class[] signature = {null};

//if (param[0] != null) {signature[0] = Object class;}
  try
  {
    if (param[0] != null)
    {
      signature[0] = Object.class;
      Method cmdMethod = appClass.getMethod(nextCmd, signature);
      cmdMethod.invoke(appObj, param);
    } else {
      Method cmdMethod = appClass.getMethod(nextCmd, null),
      cmdMethod.invoke(appObj, null);
    }
  } catch (NoSuchMethodException e)
```

```java
    {
      System.out.println("NoSuchMethodException");
    } catch (Exception e)
    {
      System.out.println("Problem invoking method: " + nextCmd);
    }
  } public void execAllCmd()
  {
    String cmd = null;

while ((cmd = nextCmd()) != null)
    {
      execCmd();
    }
  }
}

// File. IterateOutput.java
// This is an example of an Operating component import java.io.*;
import java.util.Iterator;
import java.util.LinkedList,
import java.util.ListIterator;

public class IterateOutput implements Iterator
{
  private Object appObj;
  private ListIterator listObj;

public IterateOutput(LinkedList obj)
  {
    appObj = obj,
    listObj = obj.listIterator(0);
  } public boolean hasNext()
  {
    return listObj.hasNext();
  } public Object next()
  {
    return listObj next();
  } public void remove()
  {
    listObj.remove();
  } public void printHeading()
  {
    System.out.println("\n===============");
    System.out.println(appObj.toString() + " Contents");
    System.out.println("===============");
  } public void printNext()
  {
    if (listObj.hasNext()) {System out println(listObj.next()),}
```

```
    }
    public void printAll()
    {
      printHeading();

while (listObj.hasNext())
      {
        System.out println(listObj next());
      }
    }
}
```

// Example of a command file for the Queue operating component.

```
enqueue 100
enqueue 200
dequeue
enqueue 300
dequeue
enqueue 400
enqueue 500
enqueue 600
enqueue 700
enqueue 800
enqueue 9000
dequeue
enqueue 1000
```

// Example of a command file for the Stack operating component.

```
push 100
push 200
pop
push 300
```

What is claimed is:

1. A method of integrating software components comprising:

providing an application lifecycle integration model as part of an application to be run, the application lifecycle integration model being capable of adapting to different environments by dynamically integrating different predefined software components into the application during runtime of the application, wherein the different predefined software components are categorized into different application runtime lifecycle stages, the application runtime lifecycle stages providing relative reference times to the application lifecycle integration model indicative of when the different predefined software components may be loaded for execution within the application by the application lifecycle integration model, and wherein the application lifecycle integration model of the application comprises an application runtime driver (ARD) software component and a component runtime integration box (CRIB) software component, wherein the ARD software component drives workflows of the application integration model though the application runtime lifecycle stages, and wherein the CRIB software component of the application comprises a service registry, a state table and a time table; and employing the application lifecycle integration model of the application to dynamically integrate selected software components on-the-fly into the application's runtime lifecycle without prior compilation or linking of the software components into the application as a whole, wherein dynamically integrating different software components on-the-fly into the application at runtime changes the application's functions.

2. The method of claim 1, wherein the application runtime lifecycle stages of the application comprise an application initialization stage, an application configuration stage, an application operation stage and an application finalization stage, and wherein the service registry comprises a listing of methods provided by the different predefined software components, the state table comprises an execution map for the ARD software component, including the different lifecycle stages and the software components within each lifecycle stage, and the time table comprises a history of the application's execution, including a time stamp and identification of each software component loaded.

3. The method of claim 1, wherein the different predefined software components are pre-designed to interface with the ARD and CRIB software components of the application lifecycle integration model of the application, and wherein the ARD and CRIB components of the application lifecycle integration model facilitate registration of component services within the application lifecycle integration model which can be employed by one or more of the different predefined software components.

4. The method of claim 3, wherein the application lifecycle integration model enables exchange, between the different predefined software components, of software component services, software component contexts and software component dependencies through different application runtime stages within the runtime lifecycle of the application.

5. The method of claim 1, further comprising identifying the different predefined software components within an input file for on-the-fly integration into the application at different runtime stages of the application using the application lifecycle integration model of the application.

6. A system for integrating software components comprising:

at least one processor and memory;

an application lifecycle integration model as part of an application to be run, the application lifecycle integration model being adaptive to different environments by dynamically integrating different predefined software components into the application during runtime of the application, wherein the different predefined software components are categorized into different application runtime lifecycle stages, the application runtime lifecycle stages providing relative reference times to the application lifecycle integration model indicative of when the different predefined software components may be loaded and for execution within the application by the application lifecycle integration model, and wherein the application lifecycle integration model of the application comprises an application runtime driver (ARD) software component and a component runtime integration box (CRIB) software component, wherein the ARD software component drives workflows of the application integration model through the application runtime lifecycle stages, and wherein the CRIB software component of the application comprises a service registry, a state table and a time table; and means for employing the application lifecycle integration model of the application to dynamically integrate selected software components on-the-fly into the application's runtime lifecycle without prior compilation or linking of the software components into the application as a whole, wherein dynamically integrating different software components on-the-fly into the application at runtime changes the application's functions.

7. The system of claim 6, wherein the application runtime lifecycle stages of the application comprise an application initialization stage, an application configuration stage, an application operation stage and an application finalization stage, and wherein the service registry comprises a listing of methods provided by the different predefined software components, the state table comprises an execution map for the ARD software component, including the different lifecycle stages and the software components within each lifecycle stage, and the time table comprises a history of the application's execution, including a time stamp and identification of each software component loaded.

8. The system of claim 6, wherein the different predefined software components are pre-designed to interface with the ARD and CRIB software components of the application lifecycle integration model of the application, and wherein the ARD and CRIB components of the application lifecycle integration model facilitate registration of component services within the application lifecycle integration model which can be employed by one or more of the different predefined software components.

9. The system of claim 8, wherein the application lifecycle integration model enables exchange, between the different predefined software components, of software component services, software component contexts and software component dependencies through different application runtime stages within the runtime lifecycle of the application.

10. The system of claim 6, further comprising means for identifying the different predefined software components within an input file for on-the-fly integration into the application at different runtime stages of the application using the application lifecycle integration model of the application.

11. At least one program storage device readable by a machine, tangibly embodying at least one program of instructions executable by the machine to perform a method of integrating software components, the method comprising:

providing an application lifecycle integration model as part of an application to be run, the application lifecycle integration model being capable of adapting to different environments by dynamically integrating different predefined software components into the application during runtime of the application, wherein the different predefined software components are categorized into different application runtime lifecycle stages, the application runtime lifecycle stages providing relative reference times to the application lifecycle integration model indicative of when the different predefined software components may be loaded for execution within the application by the application lifecycle integration model, and wherein the application lifecycle integration model of the application comprises an application runtime driver (ARD) software component and a component runtime integration box (CRIB) software component, wherein the ARD software component drives workflows of the application integration model through the application runtime lifecycle stages, and wherein the CRIB software component of the application comprises a service registry, a state table and a time table; and employing the application lifecycle integration model of the application to dynamically integrate selected software components on-the-fly into the application's runtime lifecycle without prior compilation or linking of the software components into the application as a whole, wherein dynamically integrating different software components on-the-fly into the application at runtime changes the application's functions.

12. The at least one program storage device of claim 11, wherein the application runtime lifecycle stages of the application comprise an application initialization stage, an application configuration stage, an application operation stage and an application finalization stage, and wherein the service registry comprises a listing of methods provided by the different predefined software components, the state table comprises an execution map for the ARD software component, including the different lifecycle stages and the software components within each lifecycle stage, and the time table comprises a history of the application's execution, including a time stamp and identification of each software component loaded.

13. The at least one program storage device of claim 11, wherein the different predefined software components are pre-designed to interface with the ARD and CRIB software components of the application lifecycle integration model of the application, and wherein the ARD and CRIB components of the application lifecycle integration model facilitate registration of component services within the application lifecycle integration model which can be employed by one or more of the different predefined software components.

14. The at least one program storage device of claim 13, wherein the application lifecycle integration model enables exchange, between the different predefined software components, of software component services, software component contexts and software component dependencies through different application runtime stages within the runtime lifecycle of the application.

* * * * *